(12) United States Patent
Chao et al.

(10) Patent No.: US 11,295,528 B2
(45) Date of Patent: Apr. 5, 2022

(54) IMAGE RENDERING METHOD AND APPARATUS, IMAGE PROCESSING DEVICE, AND STORAGE MEDIUM

(71) Applicant: TENCENT TECHNOLOGY (SHENZHEN) COMPANY LIMITED, Guangdong (CN)

(72) Inventors: Jui Hsiang Chao, Shenzhen (CN); Huai-Che Lee, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/066,707

(22) Filed: Oct. 9, 2020

(65) Prior Publication Data
US 2021/0027541 A1    Jan. 28, 2021

Related U.S. Application Data

(63) Continuation of application No. PCT/CN2019/101802, filed on Aug. 21, 2019.

(30) Foreign Application Priority Data

Aug. 21, 2018   (CN) .......................... 201810954469.7

(51) Int. Cl.
*G09G 5/00* (2006.01)
*G06T 19/00* (2011.01)
(Continued)

(52) U.S. Cl.
CPC .............. *G06T 19/006* (2013.01); *G06T 7/90* (2017.01); *G06T 15/205* (2013.01); *G06T 2207/10024* (2013.01)

(58) Field of Classification Search
CPC .... G06T 19/003; G06T 19/006; G06T 15/205
See application file for complete search history.

(56) References Cited

U.S. PATENT DOCUMENTS

| 2008/0158235 A1 | 7/2008 | Bakalash et al. |
| 2017/0200252 A1* | 7/2017 | Nguyen .............. G06F 13/4239 |

(Continued)

FOREIGN PATENT DOCUMENTS

| CN | 106484116 A | 3/2017 |
| CN | 106780642 A | 5/2017 |

(Continued)

OTHER PUBLICATIONS

International Search Report of PCT/CN2019/101802 dated Nov. 20, 2019 [PCT/ISA/210].
(Continued)

*Primary Examiner* — Charles Tseng
(74) *Attorney, Agent, or Firm* — Sughrue Mion, PLLC

(57) ABSTRACT

Embodiments of the disclosure provide an image rendering method, an image rendering apparatus, an image processing device, and a computer-readable storage medium. In one embodiment, the method, apparatus, device, and medium involve obtaining an initial image of a current scene, and determining a first area and a second area on the initial image; rendering image data of the first area based on a first rendering rule, to obtain a first sub-image; rendering image data of the second area based on a second rendering rule, to obtain a second sub-image; and generating a target display image based on the first sub-image and the second sub-image, the first rendering rule being different from the second rendering rule.

19 Claims, 18 Drawing Sheets

(51) Int. Cl.
*G06T 7/90* (2017.01)
*G06T 15/20* (2011.01)

(56) References Cited

U.S. PATENT DOCUMENTS

| | | | |
|---|---|---|---|
| 2017/0337728 A1 | 11/2017 | Bar-On | |
| 2018/0033405 A1 | 2/2018 | Tall et al. | |
| 2018/0276824 A1* | 9/2018 | Haraden | G06T 19/006 |
| 2019/0102941 A1* | 4/2019 | Khan | G06T 19/003 |
| 2019/0147643 A1* | 5/2019 | Turner | G06T 15/205 |
| | | | 345/428 |

FOREIGN PATENT DOCUMENTS

| | | |
|---|---|---|
| CN | 107203270 A | 9/2017 |
| CN | 107392986 A | 11/2017 |
| CN | 107516335 A | 12/2017 |
| CN | 107633497 A | 1/2018 |
| CN | 109242943 A | 1/2019 |
| WO | 2018/100377 A1 | 6/2018 |

OTHER PUBLICATIONS

Written Opinion of PCT/CN2019/101802 dated Nov. 20, 2019 [PCT/ISA/237].
Extended European Search Report dated Jul. 30, 2021 in European Application No. 19850930.9.

* cited by examiner

IMAGE RENDERING METHOD AND APPARATUS, IMAGE PROCESSING DEVICE, AND STORAGE MEDIUM

CROSS-REFERENCE TO RELATED APPLICATION(S)

This application is a bypass continuation application of International Application No. PCT/CN2019/101802, filed on Aug. 21, 2019, which claims priority to Chinese Patent Application No. 201810954469.7, entitled "IMAGE RENDERING METHOD AND APPARATUS, IMAGE PROCESSING DEVICE, AND STORAGE MEDIUM," filed on Aug. 21, 2018, the disclosures of which are herein incorporated by reference in their entireties.

FIELD

The disclosure relates to the field of image processing technologies, and in particular, to an image rendering method and apparatus, an image processing device, and a storage medium.

BACKGROUND

With the rapid development of electronic technologies and computer technologies, virtual reality (VR) based on various technologies such as visual simulation and a computer image is applied to an increasing quantity of industries such as a VR gaming industry, a medical industry, and an education industry.

SUMMARY

According to an aspect of an example embodiment, provided is an image rendering method, performed by an image processing device, the method including: obtaining an initial image of a current scene, and determining a first area and a second area on the initial image; rendering image data of the first area based on a first rendering rule, to obtain a first sub-image; rendering image data of the second area based on a second rendering rule, to obtain a second sub-image; and generating a target display image based on the first sub-image and the second sub-image, the first rendering rule being different from the second rendering rule.

According to an aspect of an example embodiment, provided is an image rendering method, performed by an image processing device, the method including: obtaining an initial image of a current scene, and determining a first area and a second area on the initial image; rendering image data of the first area based on a first rendering rule, to obtain a first sub-image; rendering image data of the second area based on a second rendering rule, to obtain a second sub-image; generating a mask layer, a size of the mask layer corresponding to a remaining area other than the first area in the second area; and generating a target display image based on the first sub-image, the second sub-image, and the mask layer, the first rendering rule being different from the second rendering rule.

According to an aspect of an example embodiment, provided is an image rendering apparatus, including: an obtaining unit, configured to obtain an initial image of a current scene; a determination unit, configured to determine a first area and a second area on the initial image; a rendering unit, configured to render image data of the first area based on a first rendering rule, to obtain a first sub-image, the rendering unit being further configured to render image data of the second area based on a second rendering rule, to obtain a second sub-image; and a generation unit, configured to generate a target display image based on the first sub-image and the second sub-image, the first rendering rule being different from the second rendering rule.

According to an aspect of an example embodiment, provided is an image rendering apparatus, including: at least one memory configured to store program code; and at least one processor configured to read the program code and operate as instructed by the program code, the program code including: obtaining code configured to cause at least one of the at least one processor to obtain an initial image of a current scene; determination code configured to cause at least one of the at least one processor to determine a first area and a second area on the initial image; rendering code configured to cause at least one of the at least one processor to render image data of the first area on the initial image based on a first rendering rule, to obtain a first sub-image, and render image data of the second area on the initial image based on a second rendering rule, to obtain a second sub-image; generation code configured to cause at least one of the at least one processor to generate a target display image according to the first sub-image and the second sub-image, the first rendering rule being different from the second rendering rule.

According to an aspect of an example embodiment, provided is an image processing device, including a processor and a memory, the memory being configured to store a computer program, the computer program including a program instruction, the processor being configured to invoke the program instruction to perform the image rendering method in the embodiments of the disclosure.

According to an aspect of an example embodiment, provided is a non-transitory computer storage medium, storing a computer program instruction, the computer program instruction, when executed by a processor, performing the image rendering method in the embodiments of the disclosure.

BRIEF DESCRIPTION OF THE DRAWINGS

To describe the technical solutions in the example embodiments of the disclosure, the following briefly describes the accompanying drawings for describing the embodiments. Apparently, the accompanying drawings in the following description show merely some embodiments of the disclosure, and a person of ordinary skill in the art may still derive other drawings and/or other embodiments from the accompanying drawings without creative efforts.

DETAILED DESCRIPTION

In a head-mounted display apparatus for providing a user's perceptual experience of an image may perform the following operations of rendering an image of a current scene in the head-mounted display apparatus. Image data material such as triangulations and texture mappings required for rendering the image of the current scene is migrated to a graphics processing unit (GPU) by using a central processing unit (CPU). Next, the GPU renders the image data material by using a rendering pipeline, to obtain an initial image, and performs rendering such as coloring on the initial image by using an image rendering post-processing technology, to eventually obtain the image of the current virtual reality (VR) scene that can be displayed to the user. During the rendering, to produce a parallax effect of the user's left and right eyes, rendering needs to be performed twice according to different parameters of the left and right eyes by using the rendering pipeline, to generate the image having a stereoscopic parallax effect of the head-mounted display apparatus.

During the rendering of a VR image, to ensure that the user does not feel dizzy or uncomfortable, an image refresh rate needs to be maintained during the rendering. For example, some scenes require a refresh rate equal to or even greater than 90 fps. In this case, the quality of VR visual imaging is reduced due to the limitation of computational efficiency, resulting in lower user experience.

During the post-processing of the initial image, research shows that zooming through crystalline lenses generates a depth-of-field effect that an image generated at a focal point is very clear but an image generated at a non-focal point is fuzzy.

Figure 1:
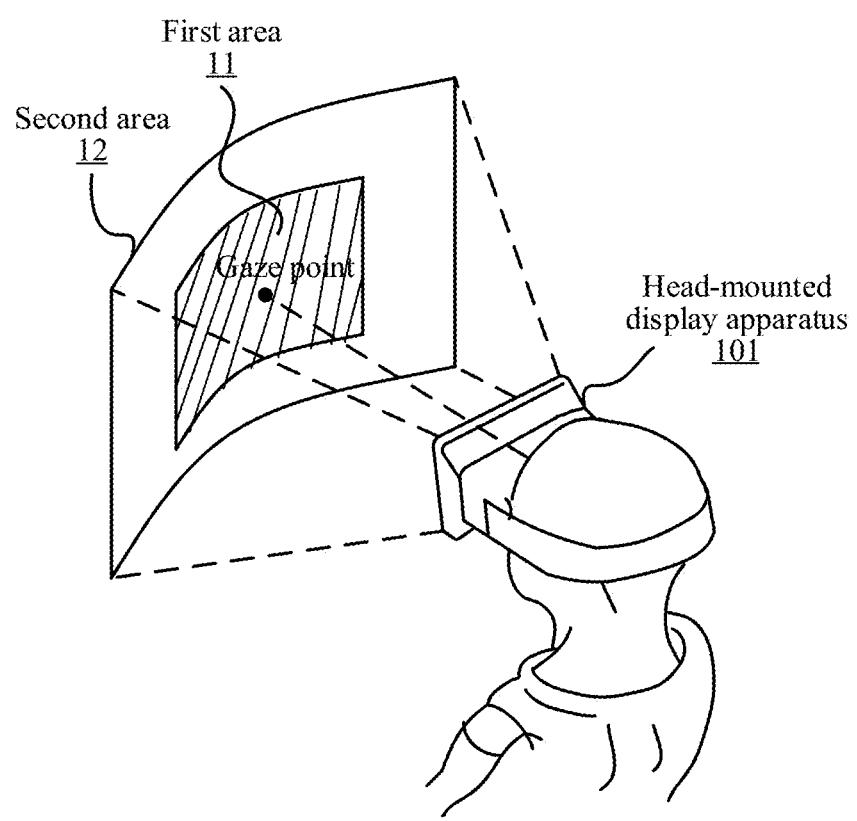
FIG. 1 is a diagram showing an application scenario of an image rendering method according to an embodiment of the disclosure.

Therefore, a rendering technology based on a gaze point is introduced in the embodiments of the disclosure, to split an initial image of a current scene in a head-mounted display apparatus 101 into a first area (an inset) 11 (which may be understood as a gaze area, that is, a focal point part on which human eyes focus, for example, a shaded area centered on a gaze point in FIG. 1) with relatively high resolution quality and a second area (an outset) 12 (for example, a non-shaded part in FIG. 1) with relatively low resolution quality. Image data of the first area 11 may be rendered at a higher resolution and a visual depth-of-field effect may be superimposed. Image data of the second area 12 may be rendered at a lower resolution and based on an image quality parameter that can reduce efficiency and utilization of the rendering (or an image quality parameter that does not require higher efficiency and utilization of the rendering). Accordingly, a clear image on which a visual depth-of-field effect is superimposed is generated in the first area 11, and a fuzzy image is generated in the second area 12. In an embodiment, the image quality parameter that does not require higher efficiency and utilization of the rendering may be preset.

After the image rendering of the first area and the image rendering of the second area are completed, two sub-images obtained through the rendering of the two areas are fused into one image to be displayed to the user. This may effectively improve the depth-of-field perception of human eyes, and software and hardware resources consumed for the image rendering are not significantly increased. In this case, efficiency in rendering the image displayed by the head-mounted display apparatus is ensured, thereby achieving higher-quality and more immersive experience of the head-mounted display apparatus.

Figure 2:
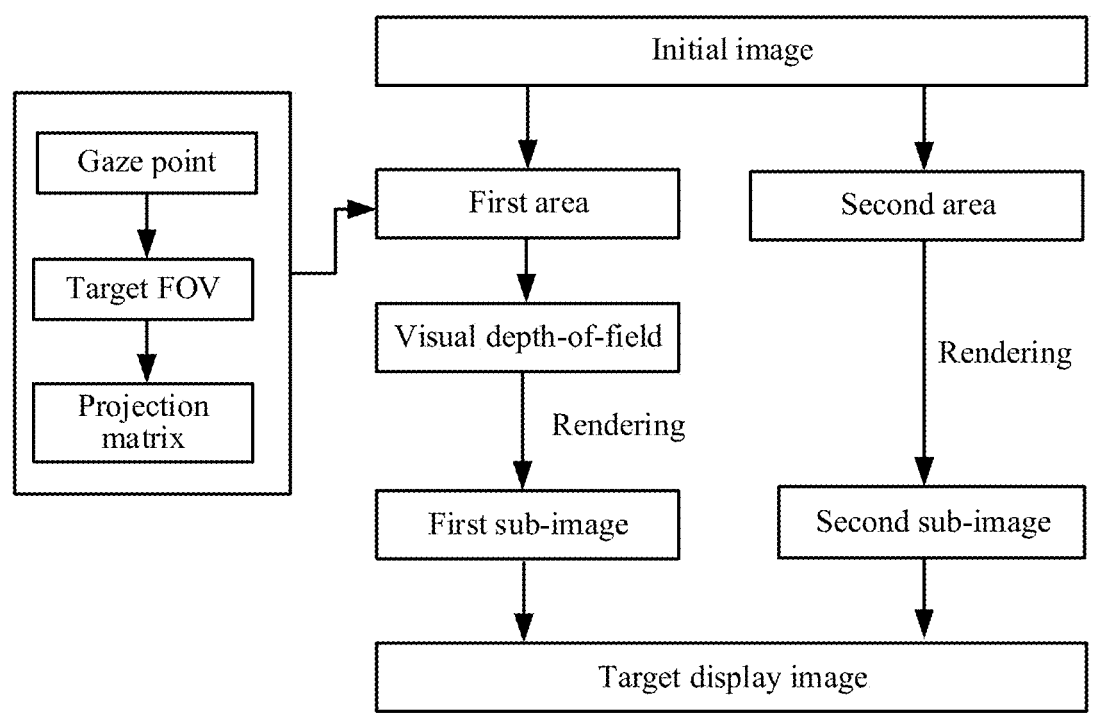
FIG. 2 is an architectural diagram of an image rendering procedure according to an embodiment of the disclosure.

FIG. 2 is an architectural diagram of an image rendering procedure according to an embodiment of the disclosure. In the architectural diagram of the image rendering procedure shown in FIG. 2, after an initial image of a current scene is obtained, a first area may be obtained. A process of determining the first area may include: determining a gaze point on the initial image, determining a projection matrix according to the gaze point and a target field of view (FOV), to obtain an image presentation range, and determining the image presentation range as the first area on the initial image.

The FOV may also be referred to as a field. The size of the FOV determines a view range of human eyes. A larger FOV indicates a larger view. Generally, a target object beyond the FOV cannot be seen by human eyes.

Further, a second area on the initial image may be determined according to the initial image and the first area on the initial image. For the first area, image data of the first area is rendered based on a first rendering rule, to obtain a first sub-image with a visual depth-of-field effect. For the second area, image data of the second area is rendered based on a second rendering rule, to obtain a second sub-image. Finally, the first sub-image and the second sub-image are fused, to obtain a target display image.

Figure 3A:
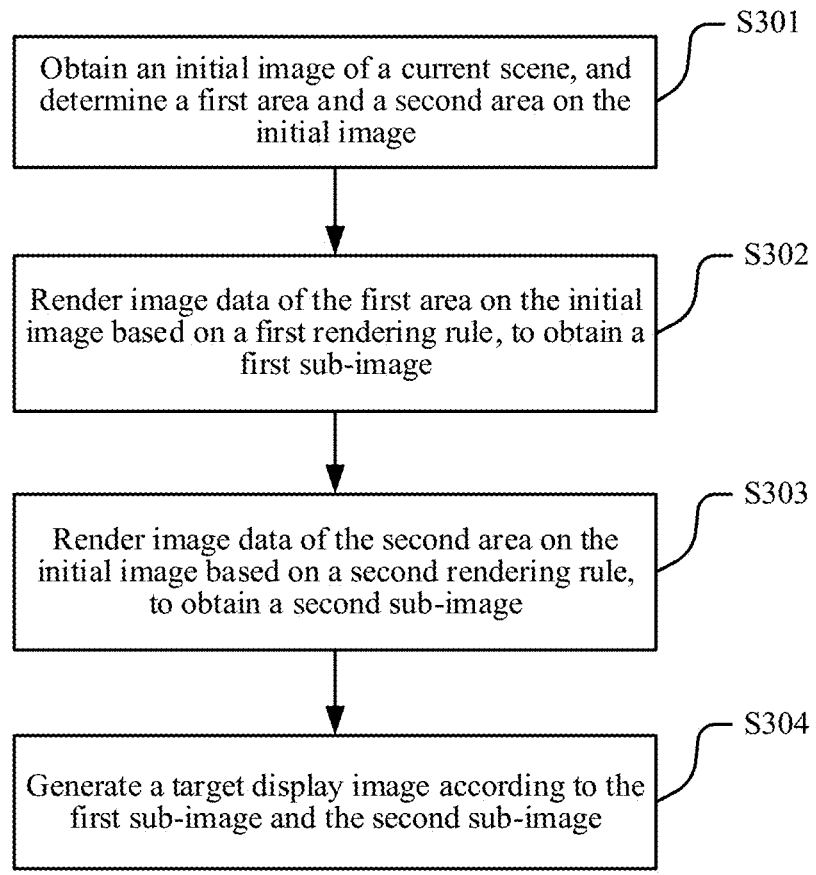
FIG. 3A is a flowchart of an image rendering method according to an embodiment of the disclosure.

FIG. 3A is a schematic flowchart of an image rendering method according to an embodiment of the disclosure. The image rendering method in this embodiment of the disclosure may be applied to a VR scene and performed by an image processing device. The image processing device may be a VR host, VR glasses or another device that may perform corresponding image rendering. When the image processing device is a VR host, the image rendering method in this embodiment of the disclosure may be specifically implemented by the VR host. The VR host sends an image obtained after rendering to VR glasses for display. When the image processing device is VR glasses, the image rendering method in this embodiment of the disclosure may be alternatively performed by VR glasses with an image rendering function, and an image eventually obtained through rendering is displayed by the VR glasses. In other embodiments, the image rendering method in this embodiment of the disclosure may further be applied to other application scenarios that require image rendering.

As shown in FIG. 3A, the image rendering method in this embodiment of the disclosure includes the following operations S301-S304:

S301: Obtain an initial image of a current scene, and determine a first area and a second area on the initial image.

In some embodiments, when rendering an image by using the image rendering method shown in FIG. 3A, the image processing device first needs to obtain the initial image of the current scene. In an embodiment, the initial image may be obtained in the following manner: obtaining material such as triangulations and texture mappings required for rendering the image of the current scene, and rendering the material based on a rendering pipeline by using a GPU, to obtain the initial image. Alternatively, the initial image may be obtained by rendering the image of the current scene in another rendering manner, which is not specifically limited in this embodiment of the disclosure.

After the initial image is obtained, the image processing device obtains the initial image of the current scene and determines the first area and the second area on the initial image. The first area may be a part on which human eyes focus, that is, the clearest part of the image. The second area may be a partial area that includes the first area on the initial image, an entire initial image area that includes the first area on the initial image or the remaining area other than the first area on the initial image. Because the part on which human eyes focus is narrow and the first area occupies only a small part of the current scene, the first area on the initial image may be smaller than the second area.

Figure 3B:
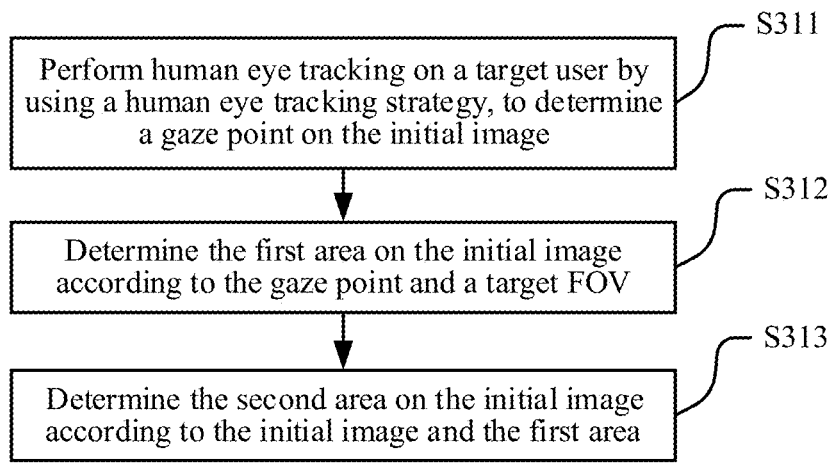
FIG. 3B is a flowchart of operation S301 in FIG. 3A according to an embodiment of the disclosure.

FIG. 3B is a flowchart of operation S301 in which the image processing device determines the first area and the second area on the initial image. As shown in FIG. 3B, operation S301 may include the following operations S311-S313:

S311: Perform human eye tracking on a target user by using a human eye tracking strategy, to determine a gaze point on the initial image.

S312: Determine the first area on the initial image according to the gaze point and a target FOV.

It would be understood that a specific position on which the eyes of the target user focus in the current scene may be determined by using the human eye tracking strategy, and the gaze point on the initial image may be determined according to the position. Based on a relationship between an FOV and a projection matrix, the target FOV used for determining the first area may be preset. Further, a target projection matrix is determined according to the target FOV, and an image presentation range is determined. An area corresponding to the image presentation range is the first area. Therefore, the determining the first area on the initial image according to the gaze point and a target FOV may be understood as determining the image presentation range centered on the gaze point as the first area.

In still another embodiment, after determining the image presentation range according to the gaze point and the target FOV, the image processing device may further expand the image presentation range by a particular percentage, for example, 10%, to obtain the first area. In this case, the first area includes an area (also referred to as a core area) represented by the image presentation range and an area (also referred to as an edge area) represented by an expansion part based on the image presentation range. In this way, when a target display image is generated according to a first sub-image and a second sub-image that are fused, to achieve a natural fusion effect. In an embodiment, the shape of the first area may be a circle centered on the gaze point, or another shape such as a square or a rectangle centered on the gaze point. A specific shape of the first area is not limited in this embodiment of the disclosure.

In other embodiments, the first area may be determined based on the performance of the image processing device and the position of the gaze point on the initial image. Higher performance of the image processing device indicates a larger selected target FOV and a larger obtained first area. In other words, the performance parameter of the image processing device is directly proportional to an FOV and the first area. In some embodiments, during actual use, a mapping relationship between the performance parameter (such as a video memory rate and/or processing frequency of the GPU) of the image processing device and the FOV is established on the premise that a refresh rate is 90 fps or another refresh rate. After the image processing device operates, the gaze point on the initial image is first determined and the performance parameter of the image processing device is detected. An FOV is selected according to the detected performance parameter and the mapping relationship. The selected FOV is used as the target FOV. Further, the first area on the initial image is determined according to the gaze point and the target FOV.

Figure 4:
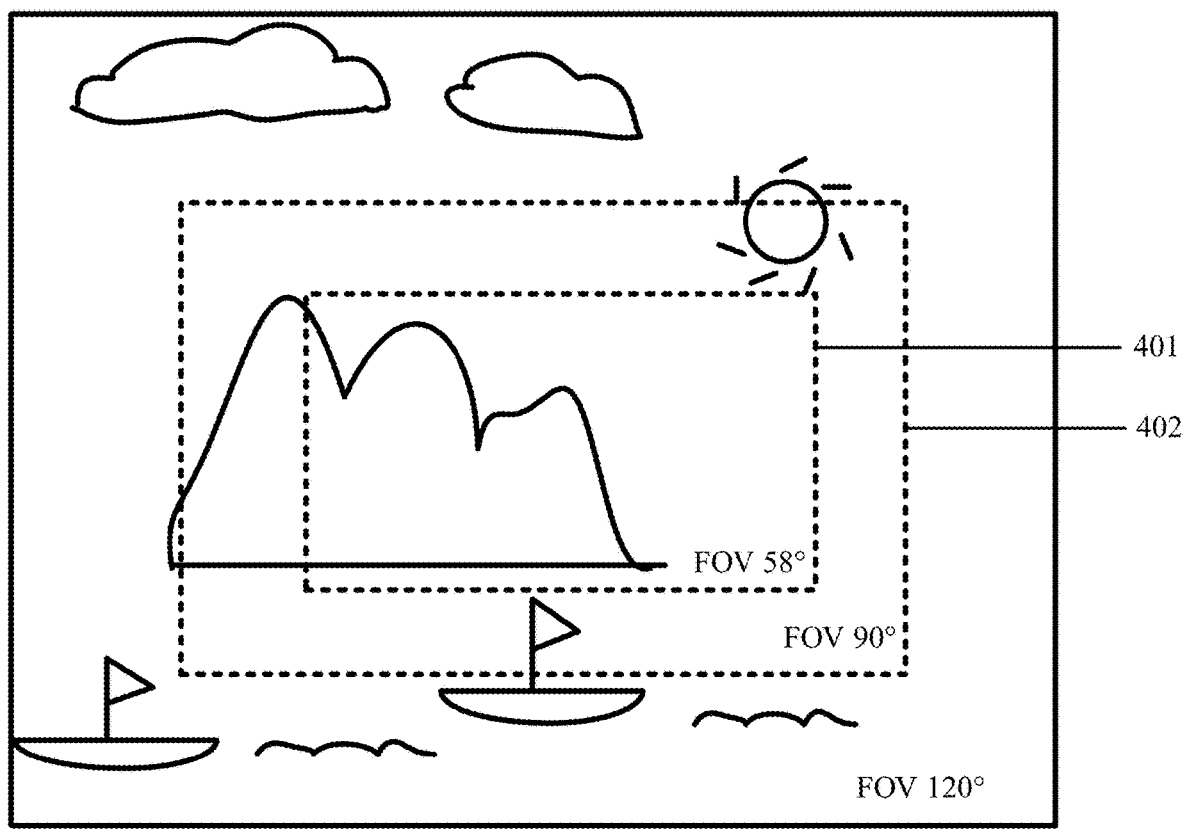
FIG. 4 is a schematic diagram of a relationship between a field of view (FOV) and an image rendering range according to an embodiment of the disclosure.

In an embodiment, different projection matrices may be generated by changing the size of the target FOV, thereby generating different image presentation ranges, which are also referred to as image rendering ranges, so that different first areas may be determined (as shown in FIG. 4). It can be learned from FIG. 4 that a projection matrix generated based on a relatively small FOV generates a relatively small view effect during rendering, and a projection matrix generated based on a relatively large FOV generates a relatively large view effect during rendering. For example, in FIG. 4, a first area 401 defined by an image presentation range corresponding to an FOV of 58° is smaller than a first area 402 defined by an image presentation range corresponding to an FOV of 90°.

The determining the first area on the initial image according to the gaze point and a target FOV may be understood as follows: after the gaze point is determined, adjusting the FOV to be equal to the target FOV, to obtain a projection matrix of the target FOV. In other words, the projection matrix may be adjusted according to the target FOV. After the projection matrix of the target FOV is obtained, the image presentation range may be determined on the initial image, and an area within the image presentation range on the initial image is the first area.

S313: Determine the second area on the initial image according to the initial image and the first area.

In some embodiments, the second area may be a partial area that includes the first area on the initial image, an entire initial image area that includes the first area on the initial image or the remaining area other than the first area on the initial image. Because the part on which human eyes focus is narrow and the first area occupies only a small part of the current scene, the first area on the initial image may be smaller than the second area.

S302: Render image data of the first area on the initial image based on a first rendering rule, to obtain a first sub-image.

In some embodiments, after the first area and the second area on the initial image of the current scene are determined, the image data of the first area and the image data of the second area are rendered respectively, and the image processing device renders the image data of the first area on the initial image based on the first rendering rule, to obtain the first sub-image. In an embodiment, the rendering image data of the first area on the initial image based on a first rendering rule may be performing rendering based on color image data of the first area and depth image data generated for the first area. A depth image is an image that includes information related to a distance to the surface of a scene object included in the initial image. To put it simply, pixel values of the depth image reflect the information about the distance between the scene object and human eyes.

Figure 3C:
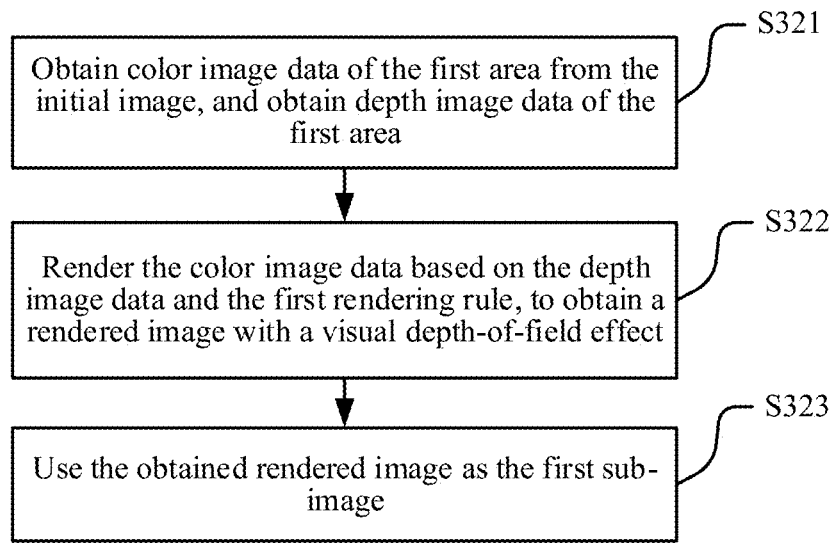
FIG. 3C is a flowchart of operation S302 in FIG. 3A according to an embodiment of the disclosure.

FIG. 3C is a flowchart of operation S302 in which the image processing device renders the image data of the first area on the initial image based on the first rendering rule, to obtain the first sub-image. As shown in FIG. 3C, operation S302 includes the following operations S321-S323:

S321: Obtain the color image data of the first area from the initial image, and obtain the depth image data of the first area.

S322: Render the color image data based on the depth image data and the first rendering rule, to obtain a rendered image with a visual depth-of-field effect.

S323: Use the obtained rendered image as the first sub-image.

In some embodiments, the visual depth-of-field effect may be a visual effect that an image at a focus is clear while an image beyond or within the focus is fuzzy. In other words, an implementation of operation S302 may be: obtaining the rendered image with the visual depth-of-field effect according to the color image data and the depth image data of the first area in combination with the first rendering rule, the rendered image being the first sub-image.

In an embodiment, the initial image obtained through the initial rendering is a color image, and the color image data of the first area may be obtained by capturing the image data of the first area from the initial image. In an embodiment, a manner of obtaining the depth image data of the first area from the initial image may be rendering depth information between a virtual camera and a three-dimensional (3D) object within a visual range of the camera by using a shader in a GPU rendering program and also information in a Z buffer, to obtain one piece of depth image data. It may be understood that the Z buffer may also be referred to as a depth buffer, and stores a distance, that is, depth information, between the camera and each pixel on an image obtained by rasterizing primitives required for rendering the object. The shader in the GPU rendering program may process the saturation and brightness of all pixels, and may also generate effects such as fuzziness and highlight. During the drawing of the depth image data, the depth image data may be generated by using the shader and depth values stored in the Z buffer.

S303: Render the image data of the second area on the initial image based on a second rendering rule, to obtain the second sub-image.

In some embodiments, during the rendering of the image data of the second area after the first area and the second area on the initial image of the current scene are determined, the image processing device may render the image data of the second area on the initial image based on the second rendering rule, to obtain the second sub-image. In an embodiment, the rendering the image data of the second area on the initial image based on a second rendering rule may be rendering the image data of the second area in a rendering manner that does not require higher efficiency and utilization of the rendering. For example, before the image data of the second area is rendered, target material required for rendering the image data of the second area may be obtained first. Next, it may be determined whether reference material of the same type as the target material but with relatively low quality is present in a material library, and the material quality of the reference material is lower than the material quality of the target material. If such reference material is present, the rendering of the image data of the second area is completed by using the reference material with relatively low quality.

In an embodiment, operation S303 may include the following operation: rendering the image data of the second area based on a resolution and an image quality parameter indicated by the second rendering rule, to obtain the second sub-image. In an embodiment, the resolution indicated by the second rendering rule is lower than a resolution used for rendering the image data of the first area during the rendering of the first area, and the image quality parameter indicated by the second rendering rule is set to an image quality parameter that does not require higher efficiency and utilization of the rendering. In an embodiment, the image quality parameter may be a rendering resolution and/or rendering material quality, and the image quality parameter that is indicated by the second rendering rule and does not require higher efficiency and utilization of the rendering may be a relatively low rendering resolution and relatively low rendering material quality. A standard resolution may be set. In normal cases, the initial image is rendered based on the standard resolution. If it is detected that rendering needs to be performed according to an area, for example, if it is detected that an area-based rendering function is enabled, the first area is rendered at a resolution greater than or equal to the standard resolution, and the second area is rendered at a resolution lower than the standard resolution.

It may be understood that, the resolution and the image quality parameter indicated by the second rendering rule may be used for rendering the second area, to compensate for partial efficiency loss during the rendering of the first area by saving efficiency during the rendering of the second area. Therefore, a high-quality image effect that may improve image depth-of-field quality and avoid excessive consumption of computational efficiency is achieved. In other words, when rendering needs to be performed according to an area, the rendering of the first area consumes more software and hardware resources of the image processing device, but the rendering of the second area consumes fewer software and hardware resources of the image processing device. In this case, consumed resources of the image processing device are not significantly increased. As required by the resolutions (for example, the resolution of the first area is the standard resolution) and the image quality parameters in the first rendering rule and the second rendering rule, fewer resources of the image processing device are consumed during the area-based rendering, thereby further ensuring a refresh rate.

S304: Generate the target display image according to the first sub-image and the second sub-image.

In some embodiments, according to the image rendering method shown in FIG. 3A, after rendering the first area and the second area respectively to obtain the first sub-image and the second sub-image, the image processing device may generate the target display image according to the first sub-image and the second sub-image, and display the target display image in the current scene of the head-mounted display apparatus. The obtained target display image includes two parts. One part of the image at which the eyes of the target user gaze is a clear image area with a visual depth-of-field effect (as shown by an area A in FIG. 5). The clear image area is obtained through superimposition based on the first sub-image and the second sub-image. The other part of the image at which the eyes do not gaze is a fuzzy image area without a visual depth-of-field effect (as shown by an area B in FIG. 5). The fuzzy image area is obtained based on the second sub-image, which not only ensures the computational efficiency of image rendering, but also effectively improves a depth-of-field effect of an eventually displayed VR image, thereby implementing more immersive experience. In an embodiment, the first sub-image may be directly superimposed on the second sub-image according to an area position of the first area, corresponding to the first sub-image, on the initial image, to cover image content at the corresponding area position on the second sub-image, to obtain the target display image.

Figure 5:
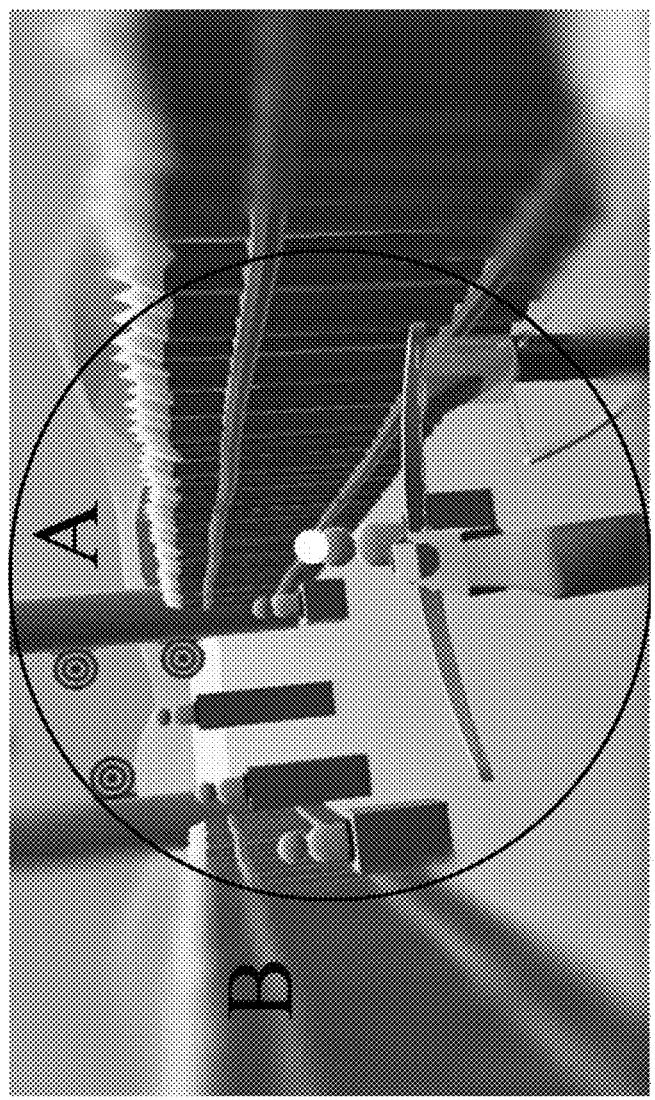
FIG. 5 shows a target display image according to an embodiment of the disclosure.

In an embodiment, to generate the target display image shown in FIG. 5, the image processing device needs to render the first area at a rendering resolution higher than the rendering resolution used for rendering the second area. A change value between the rendering resolution used for rendering the first area and the rendering resolution used for rendering the second area may be determined according to the performance of the image processing device. If the performance of the image processing device is relatively high, the two rendering resolutions may be set to ensure that the change value between the two rendering resolutions is relatively small. In other words, both the resolution used for rendering the first area and the resolution used for rendering the second area are relatively high. If the performance of the image processing device is medium, the two rendering resolutions may be set to ensure that the change value between the two rendering resolutions is relatively large. In other words, the resolution used for rendering the second area is relatively low.

Because the rendering resolution used for rendering the first area is different from the rendering resolution used for rendering the second area, the resolutions of the first sub-image and the second sub-image obtained through the rendering are also different. Therefore, when the target display image is generated according to the first sub-image and the second sub-image in operation S304, a mask layer is introduced to avoid a radical visual aberration at an edge of the first sub-image during fusion due to the different resolutions of the two sub-images. The target display image is generated according to the mask layer, the first sub-image, and the second sub-image.

Figure 3D:
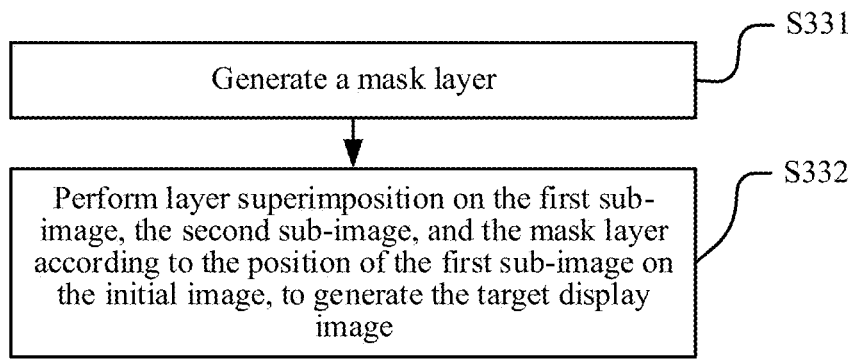
FIG. 3D is a flowchart of operation S304 in FIG. 3A according to an embodiment of the disclosure.

FIG. 3D is a flowchart of operation S304 in which the target display image is generated according to the first sub-image and the second sub-image according to an embodiment of the disclosure. As shown in FIG. 3D, operation S304 may include the following operations:

S331: Generate the mask layer.

S332: Perform layer superimposition on the first sub-image, the second sub-image, and the mask layer according to the position of the first sub-image on the initial image, to generate the target display image. The target display image includes a gaze area and a non-gaze area. The gaze area is an overlapping area formed by performing layer superimposition on the first sub-image, the second sub-image, and the mask layer. A color value of a pixel in the gaze area is calculated based on color values of pixels in areas respectively corresponding to the overlapping area on the first sub-image, the second sub-image, and the mask layer. A color value of a pixel in the non-gaze area is determined according to color values of pixels on the second sub-image.

It may be understood that the mask layer is introduced during image fusion. In this embodiment of the disclosure, the function of the mask layer is to enable a color value of a pixel at a position closer to a gaze point of the eventually obtained target display image to be closer to a color value of a pixel on the first sub-image, and to enable a color value of a pixel at a position farther from the gaze point of the target display image to be closer to a color value of a pixel on the second sub-image, thereby generating a smooth transition effect.

In an embodiment, the size of the mask layer may be determined according to the size of the first sub-image. To achieve natural fusion of the first sub-image and the second sub-image, the size of the mask layer is to be greater than or equal to the size of the first sub-image. In an embodiment, the shape of the mask layer may be the same as the shape of the first sub-image. For example, if the shape of the first sub-image is a circle, the shape of the mask layer may also be a circle. If the shape of the first sub-image is a square, the shape of the mask layer may also be a square. In still another embodiment, the shape of the mask layer may be alternatively different from the shape of the first sub-image. The image processing device may select an appropriate size and shape for the mask layer as required by the current scene.

After the size and the shape of the mask layer are determined, the mask layer is generated. Next, a mask value of each pixel on the mask layer is calculated. In an embodiment, the method for calculating a mask value of a target pixel on a mask layer may be: determining a circular area on the mask layer, obtaining a radius value of the circular area, the radius value being denoted by R; determining a distance between the target pixel and the center of the circular area, the distance being denoted by r; and calculating the mask value of the target pixel by using the following formula: $M=1-(r/R)$, M representing the mask value of the target pixel on the mask layer. It may be understood that a mask value of a non-target pixel on the mask layer may be calculated by using the same method for calculating a mask value of a target pixel, the target pixel on the mask layer being a currently calculated pixel on the mask layer.

After the mask layer is generated, the image processing device performs layer superimposition on the first sub-image, the second sub-image, and the mask layer according to the position of the first sub-image on the initial image, to generate the target display image. The target display image includes the gaze area and the non-gaze area. The gaze area corresponds to an overlapping area of the first sub-image, the second sub-image, and the mask layer. The non-gaze area is the remaining area other than the overlapping area on the second sub-image. In other words, the target display image is obtained by superimposing the first sub-image, the second sub-image, and the mask layer.

Figure 3E:
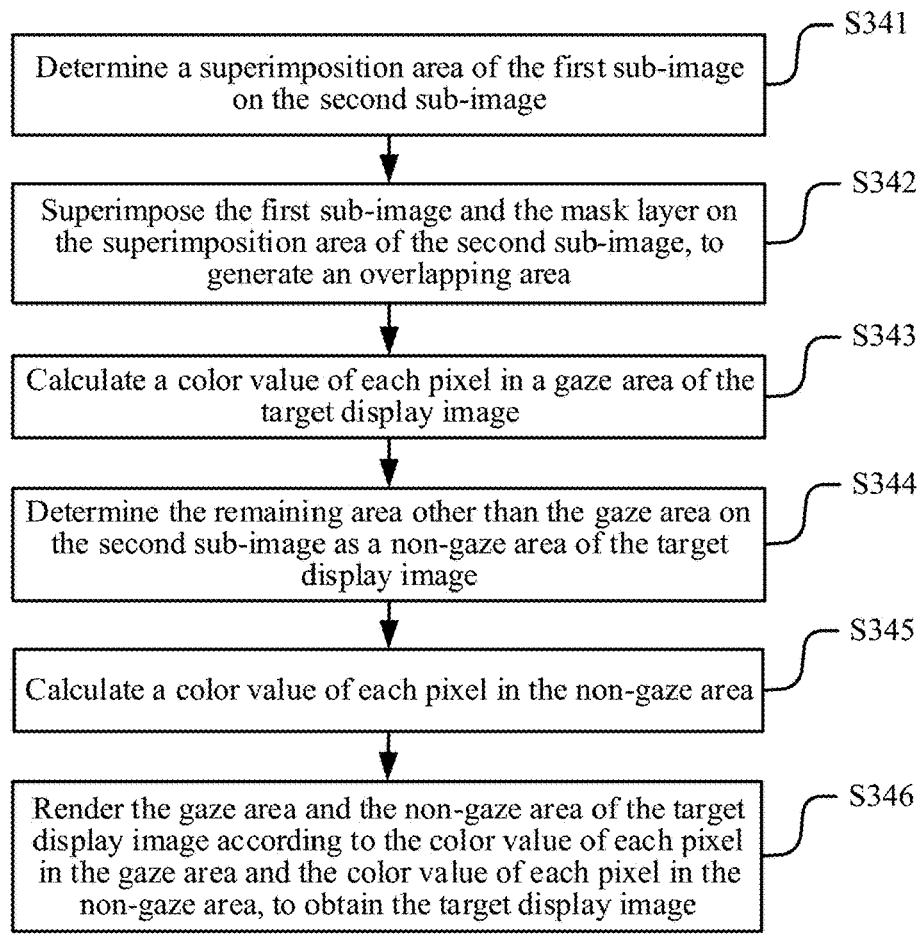
FIG. 3E is a flowchart of operation S332 in FIG. 3D according to an embodiment of the disclosure.

In an embodiment, because the size of the second sub-image is the same as the size of the initial image, the position of the first sub-image on the initial image may also be understood as a superimposition position of the first sub-image on the second sub-image. FIG. 3E shows a flowchart of operation S332 in an embodiment of the disclosure. As shown in FIG. 3E, operation S332 includes the following operations:

S341: Determine a superimposition area of the first sub-image on the second sub-image.

S342: Superimpose the first sub-image and the mask layer on the superimposition area of the second sub-image, to generate an overlapping area, that is, the gaze area of the target display image.

S343: Calculate a color value of each pixel in the gaze area of the target display image.

S344: Determine the remaining area other than the gaze area on the second sub-image as the non-gaze area of the target display image.

S345: Calculate a color value of each pixel in the non-gaze area.

S346: Render the gaze area and the non-gaze area of the target display image according to the color value of each pixel in the gaze area and the color value of each pixel in the non-gaze area, to obtain the target display image.

Figure 6A:
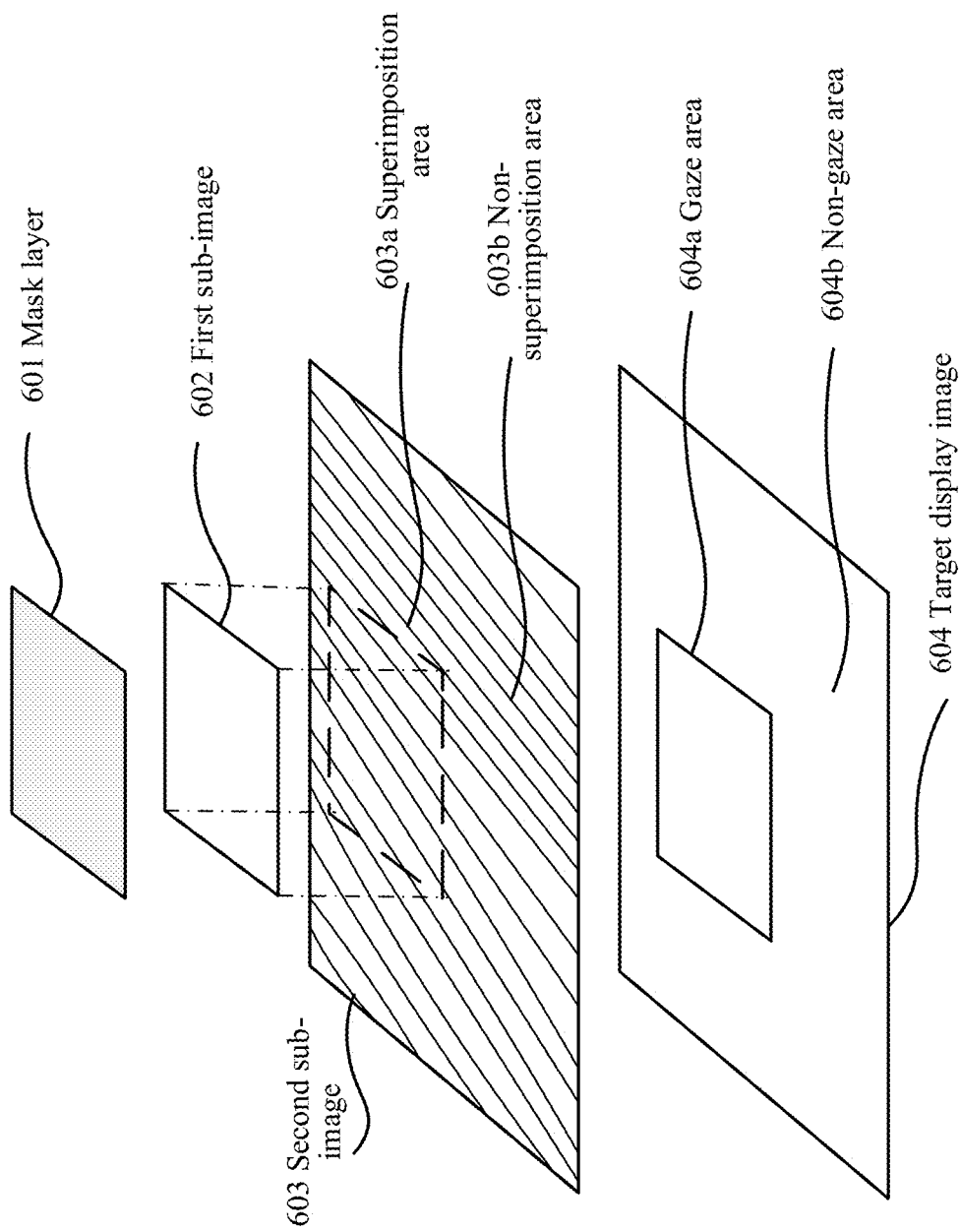
FIG. 6A is a schematic diagram of a method for generating a target display image according to an embodiment of the disclosure.

For example, FIG. 6A is a schematic diagram of a method for generating a target display image. As shown in FIG. 6A, 601 represents a mask layer, 602 represents a first sub-image, 603 represents a second sub-image, and 604 represents a target display image. Assuming that it is determined that an overlapping area of the first sub-image 602 on the second sub-image 603 is a dotted-line box 603a, 603a is used as a gaze area of the target display image, and a shaded area 603b on the second sub-image 603 is used as a non-gaze part of the target display image. Next, a color value of each pixel in the gaze area and a color value of each pixel in the non-gaze area are calculated, to obtain the target display image.

In an embodiment, the color value of each pixel in the gaze area of the target display image may be calculated by using the following formula: $B=I \times M + O \times (1-M)$. B represents a color value of a target pixel in the gaze area, I represents a color value of a pixel that has the same image position as the target pixel on the first sub-image, O represents a color value of a pixel that has the same image position as the target pixel on the second sub-image, and M represents a mask value of a pixel that has the same image position as the target pixel on the mask layer. The target pixel in the gaze area is a currently calculated pixel in the gaze area.

Figure 6B:
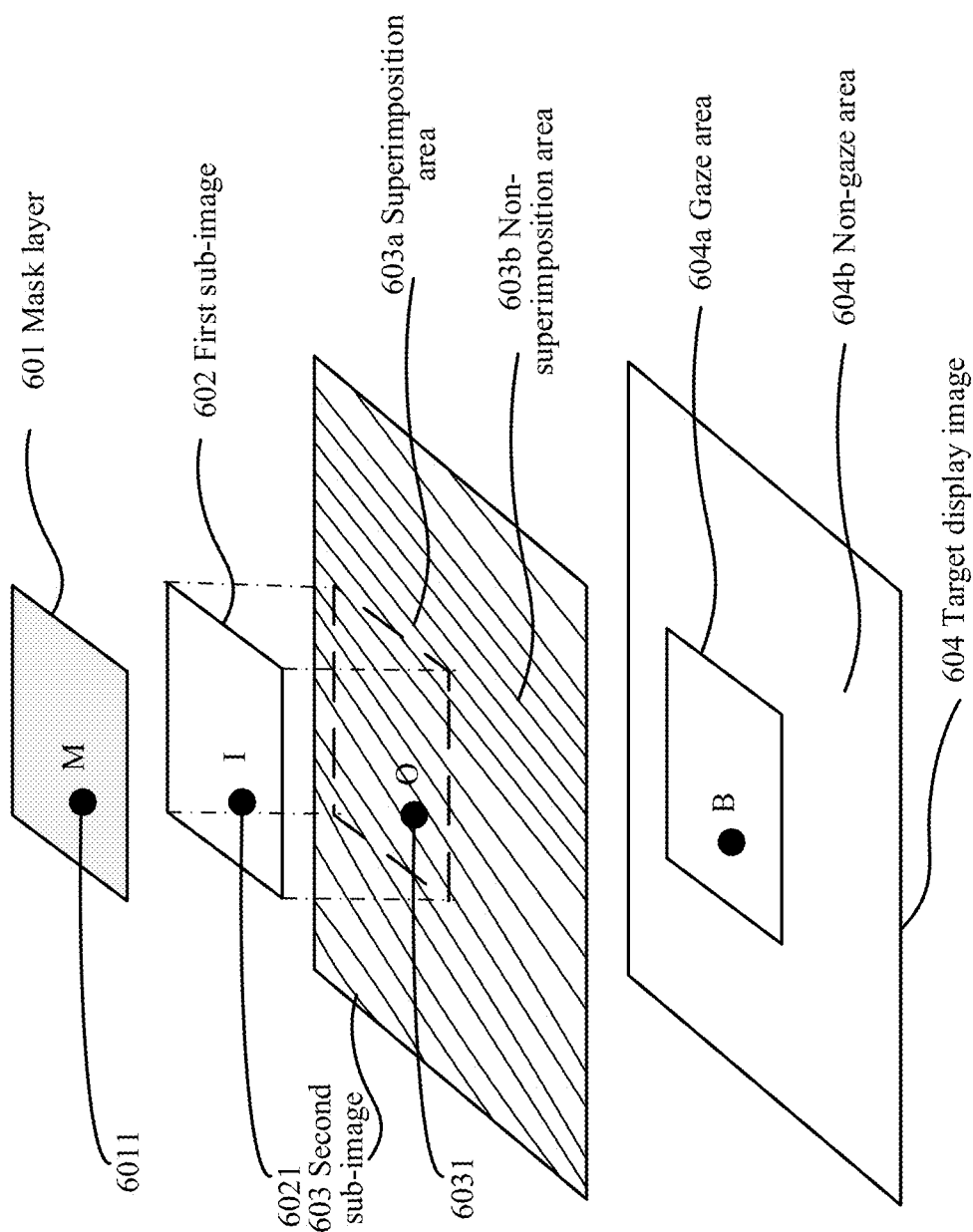
FIG. 6B is a schematic diagram of a method for calculating a color value of a pixel in a gaze area according to an embodiment of the disclosure.

For example, based on the method for generating a target display image shown in FIG. 6A, FIG. 6B is a schematic diagram of a method for calculating a color value of a pixel in a gaze area. Assuming that a point B is the target pixel in the gaze area of the target display image, to determine a color value of the target pixel B, pixels that have the same image position as the target pixel are found on the mask layer 601, the first sub-image 602, and the second sub-image 603, respectively, and are recorded as points 6011, 6021, and 6031. Color values of points 6011, 6021, and 6031 are obtained and are denoted by M, I, and O, respectively. Finally, the color value of the target pixel B in the gaze area may be obtained by using the formula: $B=I \times M + O \times (1-M)$.

In an embodiment, the non-gaze area of the target display image is the remaining area other than the overlapping area on the second sub-image. In other words, the non-gaze area of the target display image is a part of the second sub-image. Therefore, a manner of calculating the color value of each pixel in the non-gaze area may be using a color value of each pixel that falls in the non-gaze area on the second sub-image as the color value of each pixel in the non-gaze area.

In an embodiment, the generating the target display image according to the first sub-image and the second sub-image in operation S304 may be alternatively: superimposing the first sub-image on a corresponding position on the second sub-image. In other words, the first sub-image is used to cover a part of the second sub-image at a position corresponding to the first area, so that a target image displayed to the user is an image in which a part at which the eyes of the target user gaze is clear with a visual depth-of-field effect and a part at which the eyes of the target user do not gaze is fuzzy without a visual depth-of-field effect.

Figure 3F:
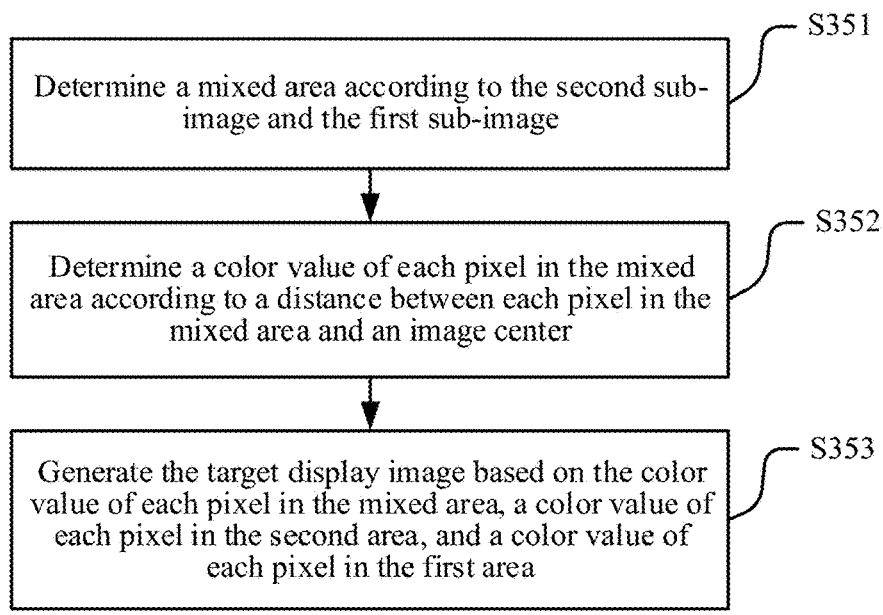
FIG. 3F is another flowchart of operation S304 in FIG. 3A according to an embodiment of the disclosure.

FIG. 3F is a flowchart of operation S304 in which the target display image is generated according to the first sub-image and the second sub-image according to an embodiment of the disclosure. As shown in FIG. 3F, operation S304 may include the following operations:

S351: Determine a mixed area according to the second sub-image and the first sub-image.

S352: Determine a color value of each pixel in the mixed area according to a distance between each pixel in the mixed area and an image center (or a center of the initial image).

S353: Generate the target display image based on the color value of each pixel in the mixed area, a color value of each pixel in the second area, and a color value of each pixel in the first area.

Figure 7A:
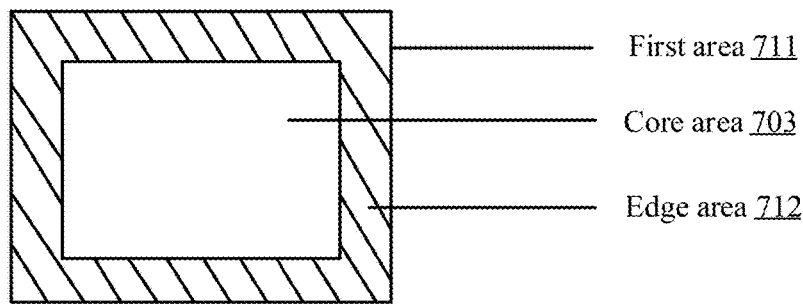
FIG. 7A is a schematic diagram of a first area according to an embodiment of the disclosure.

In an embodiment, the first sub-image includes an edge area and a core area. The core area is determined according to the gaze point and the target FOV, and the edge area may be understood as being obtained by expanding the core area by a particular percentage, for example, 10%. The percentage may be set to different values according to different application scenarios. For example, in the first area 711 shown in FIG. 7A, a shaded area is the edge area 712 and a non-shaded area is the core area 703. It may be understood that FIG. 7A is only a schematic diagram of the edge area and the core area of the first area. In an embodiment, the edge area is much smaller than the core area.

Figure 3G:
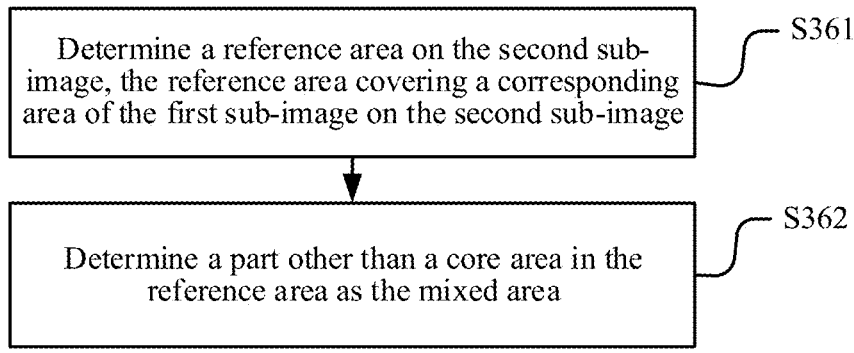
FIG. 3G is a flowchart of operation S351 in FIG. 3F according to an embodiment of the disclosure.

In an embodiment, the first sub-image includes the edge area and the core area. FIG. 3G is a flowchart of operation S351 in which the mixed area is determined according to the second sub-image and the first sub-image according to an embodiment of the disclosure. As shown in FIG. 3G, operation S351 includes the following operations:

S361: Determine a reference area on the second sub-image, the reference area covering a corresponding area of the first sub-image on the second sub-image.

S362: Determine a part other than the core area in the reference area as the mixed area.

In some embodiments, during the determination of the mixed area, a position at which the first sub-image is superimposed on the second sub-image is determined first. Next, a reference area is determined on the second sub-image. The reference area can cover the position of the first sub-image on the second sub-image. Next, the core area on the first sub-image is removed from the reference area, and the remaining part in which the first sub-image overlaps the reference area is determined as the mixed area.

Figure 7B:
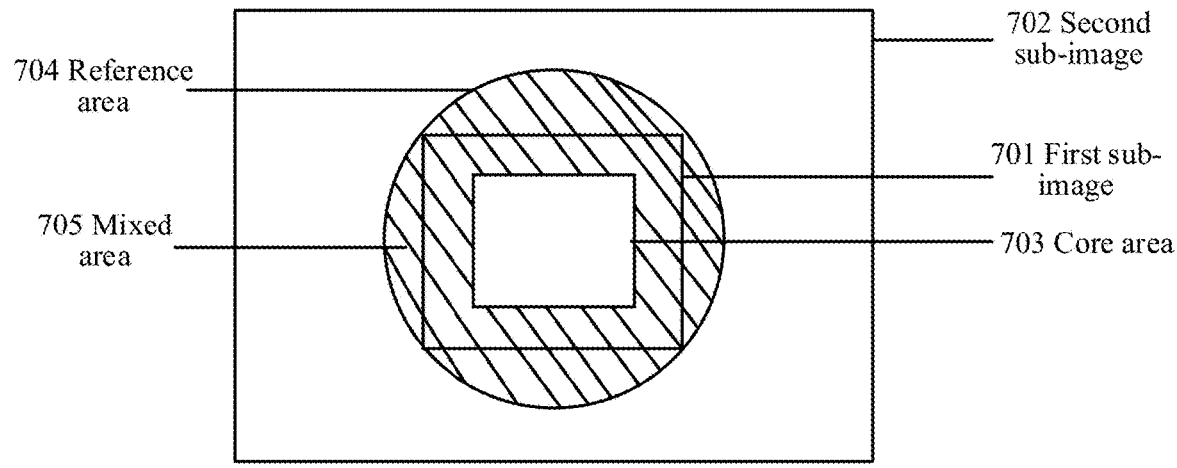
FIG. 7B is a schematic diagram of a method for determining a mixed area according to an embodiment of the disclosure.

In an embodiment, the size of the reference area may be greater than the size of the first sub-image. In this case, the reference area covers both the corresponding area of the first sub-image on the second sub-image and a part of the second sub-image. For example, FIG. 7B shows a method for determining a mixed area. An area 701 represents the first sub-image, an area 702 represents the second sub-image, an area 703 represents the core area on the first sub-image, an area 704 represents the reference area, and a shaded area 705 represents the mixed area.

Figure 8:
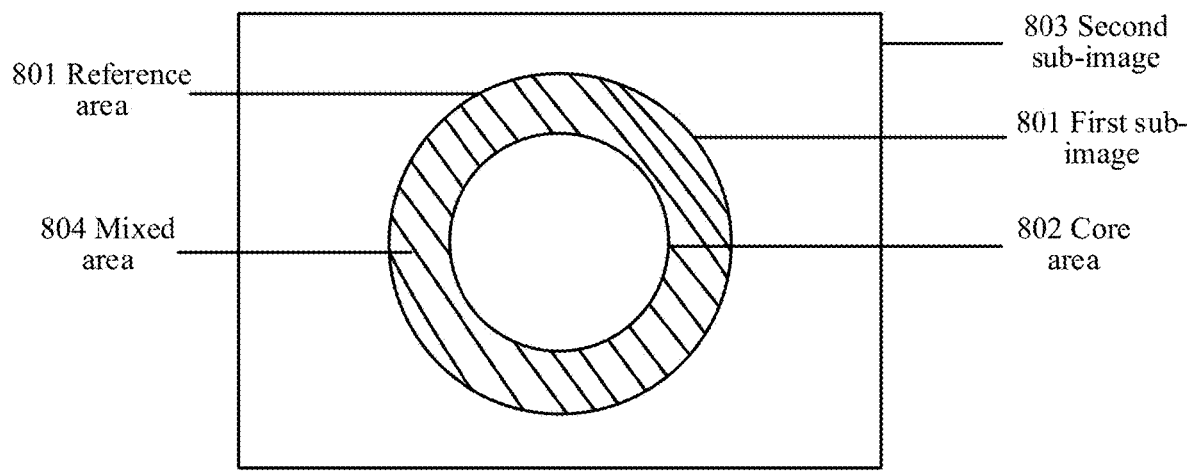
FIG. 8 is a schematic diagram of another method for determining a mixed area according to an embodiment of the disclosure.

In still another embodiment, the size of the reference area may be equal to the size of the first sub-image. In this case, the reference area may exactly cover the corresponding area of the first sub-image on the second sub-image. For example, FIG. 8 shows another method for determining a mixed area. An area 801 represents both the first sub-image and the reference area, an area 802 represents the core area on the first sub-image, an area 803 represents the second sub-image, and a shaded area 804 represents the mixed area.

Figure 3H:
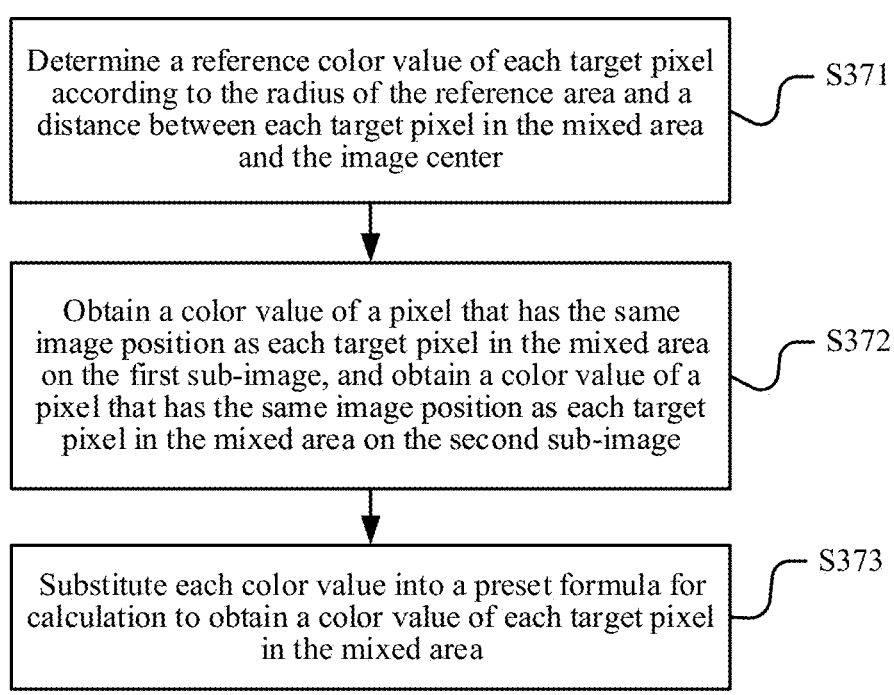
FIG. 3H is a flowchart of operation S352 in FIG. 3F according to an embodiment of the disclosure.

After the mixed area is determined, the image processing device then determines the color value of each pixel in the mixed area. FIG. 3H is a flowchart of operation S352 in which the color value of each pixel in the mixed area is determined according to the distance between the pixel and the image center (or a center of the initial image) according to an embodiment of the disclosure. As shown in FIG. 3H, operation S352 may include the following operations:

S371: Determine a reference color value of a target pixel according to the radius of the reference area and a distance between the target pixel in the mixed area and the image center, the target pixel in the mixed area being a currently calculated pixel in the mixed area.

S372: Obtain a color value of a pixel that has the same image position as each target pixel in the mixed area on the first sub-image, and obtain a color value of a pixel that has the same image position as each target pixel in the mixed area on the second sub-image.

S373: Substitute each color value into a preset formula for calculation. An obtained calculation result is a color value of each target pixel in the mixed area. In other words, the color value of each target pixel in the mixed area is calculated according to the color value of the pixel that has the same image position as each target pixel in the mixed area on the first sub-image and the color value of the pixel that has the same image position as each target pixel in the mixed area on the second sub-image.

Similarly, a color value of each pixel other than the target pixel in the mixed area is determined by using the same method for determining a color value of a target pixel.

Figure 3I:
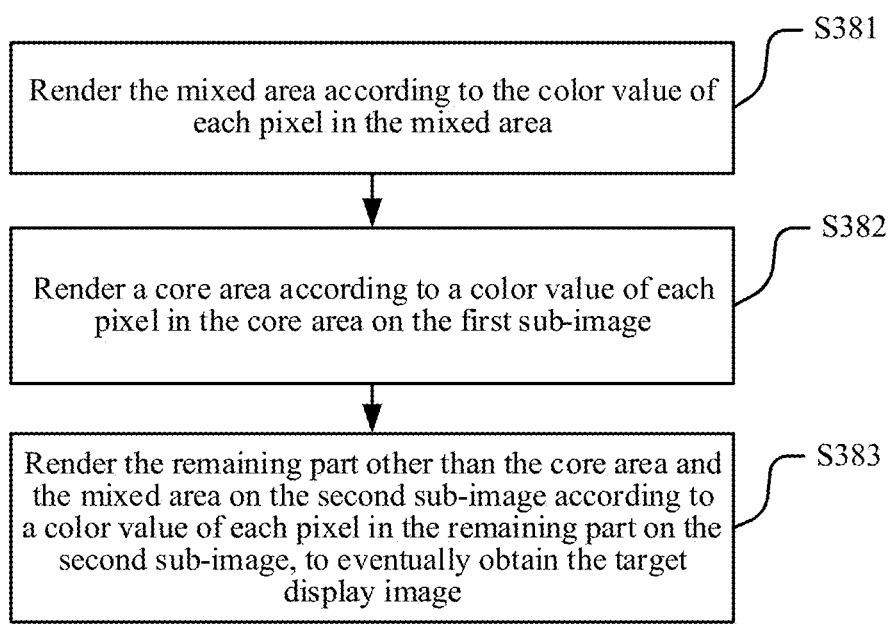
FIG. 3I is a flowchart of operation S353 in FIG. 3F according to an embodiment of the disclosure.

FIG. 3I is a flowchart of operation S353 according to an embodiment of the disclosure. As shown in FIG. 3I, operation S353 may include the following operations:

S381: Render the mixed area according to the color value of each pixel in the mixed area.

S382: Render a core area according to a color value of each pixel in the core area on the first sub-image.

S383: Render the remaining part other than the core area and the mixed area on the second sub-image according to a color value of each pixel in the remaining part on the second sub-image, to eventually obtain the target display image.

In conclusion, an embodiment of the disclosure provides the foregoing two implementations for the generating the target display image according to the first sub-image and the second sub-image in operation S304. In the first implementation, the mask layer is introduced, and a color value of each pixel in an overlapping area of the mask layer, the first sub-image, and the second sub-image (e.g., gaze area) and a color value of each pixel in a non-overlapping area of the mask layer, the first sub-image, and the second sub-image (e.g., non-gaze area) are used to obtain the target display image. In the second implementation, the mixed area is introduced, and the target display image is generated according to a color value of each pixel in the mixed area, a color value of each pixel on the first sub-image, and a color value of each pixel on the second sub-image.

When the target display image is generated according to the first sub-image and the second sub-image, an appropriate method for generating a target display image may be selected from the foregoing two implementations according to the resolution of the first sub-image and the resolution of the second sub-image. In an embodiment, if a difference between the two resolutions used for respectively rendering the first sub-image and the second sub-image is greater than or equal to a preset value, a first method may be used to generate the target display image. For example, if the resolution used for rendering the first sub-image is 200 pixels per inch (ppi), the resolution used for rendering the second sub-image is 160 ppi, and the preset difference is 20, the first method may be used to generate the target display image. If the difference between the two resolutions used for respectively rendering the first sub-image and the second sub-image is less than the preset value, a second method may be used to generate the target display image.

Figure 9A:
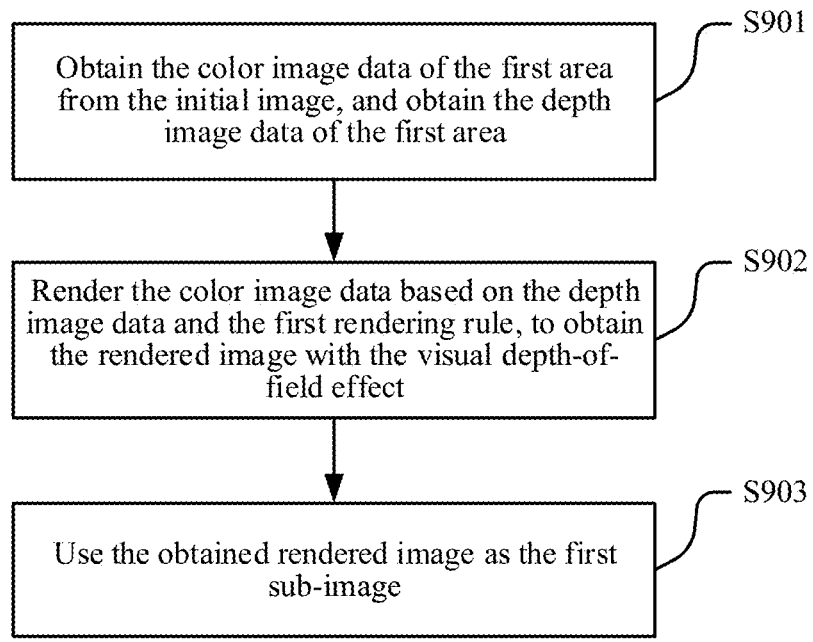
FIG. 9A is a flowchart of a method for rendering image data of a first area according to an embodiment of the disclosure.

FIG. 9A is a schematic flowchart of an image rendering method for the first area according to an embodiment of the disclosure. The method in this embodiment of the disclosure may correspond to operation S302. Similarly, the method in this embodiment of the disclosure may also be performed by an image processing device such as a VR host or VR glasses. As shown in FIG. 9A, the method includes the following operations S901-S903:

S901: Obtain the color image data of the first area from the initial image, and obtain the depth image data of the first area.

In an embodiment, the image processing device may generate a reference layer set according to the color image data. The reference layer set includes a plurality of reference layers, the reference layers has the same image size, and the resolutions of the reference layers are different and less than an image resolution corresponding to the color image data. In an embodiment, the reference layers may be obtained by performing resolution reduction on the color image data according to a preset rule, and then size processing is performed according to an image size of the color image data. For example, the image size of the color image data is simply increased.

It may be understood that if the size of each reference layer obtained after the resolution reduction is performed on the color image data according to the preset rule is equal to the image size of the color image data, the size of the reference layer may not be processed. If the size of each reference layer obtained after the resolution reduction is performed on the color image data according to the preset rule is less than the image size of the color image data, the size of each reference layer may be increased, so that the size of each reference layer is the same as the image size of the color image data. In other words, the reference layers may be understood as images that have the same size as the color image data of the first area but have resolutions different from the color image data of the first area. For example, assuming that the resolution of the color image data of the first area is 600×600, a plurality of reference layers with different degrees of fuzziness but the same image size may be generated according to a preset rule, the resolutions of the reference layers being 300×300, 150×150, 75×75, 30×30, and the like, respectively.

S902: Render the color image data based on the depth image data and the first rendering rule, to obtain a rendered image with a visual depth-of-field effect.

Figure 10:
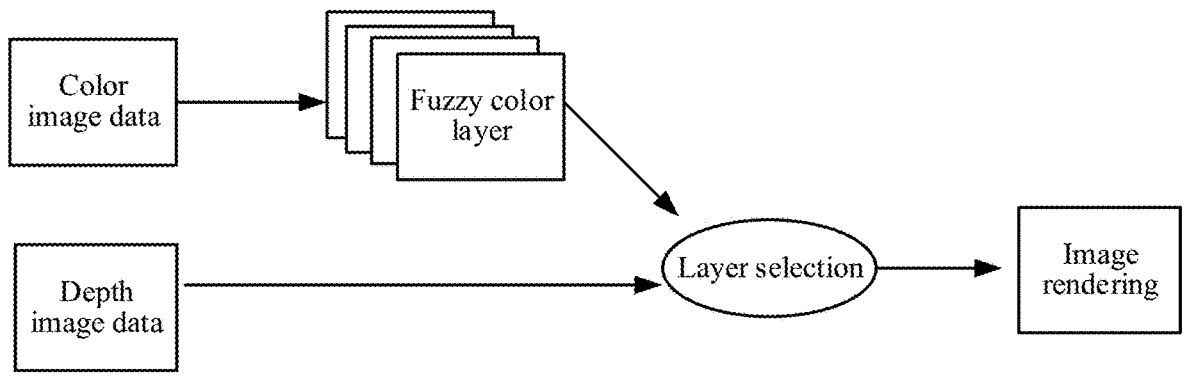
FIG. 10 is a flowchart of a method for rendering a visual depth-of-field according to an embodiment of the disclosure.

In an embodiment, after the color image data and the depth image data of the first area are obtained, the color image data is rendered based on the depth image data and the first rendering rule, to obtain the rendered image with the visual depth-of-field effect in operation S902. A process of performing visual depth-of-field rendering is described in an embodiment corresponding to FIG. 10.

S903: Use the obtained rendered image as the first sub-image.

In an embodiment, the color image data may be rendered based on depth information reflected by the depth image data and the first rendering rule in operation S902. In an embodiment, the rendering the color image data based on the depth information reflected by the depth image data and the first rendering rule may be specifically selecting a target layer from the reference layers for each pixel in the color image data according to the depth information reflected by the depth image data, to determine the color value of each pixel on the first sub-image that needs to be generated. In this way, the rendering of each pixel is completed, and therefore the rendering of the color image data is completed. The reference layers are generated according to the color image data, the reference layers have the same image size, and the resolutions of the reference layers are different and less than the image resolution corresponding to the color image data.

Figure 9B:
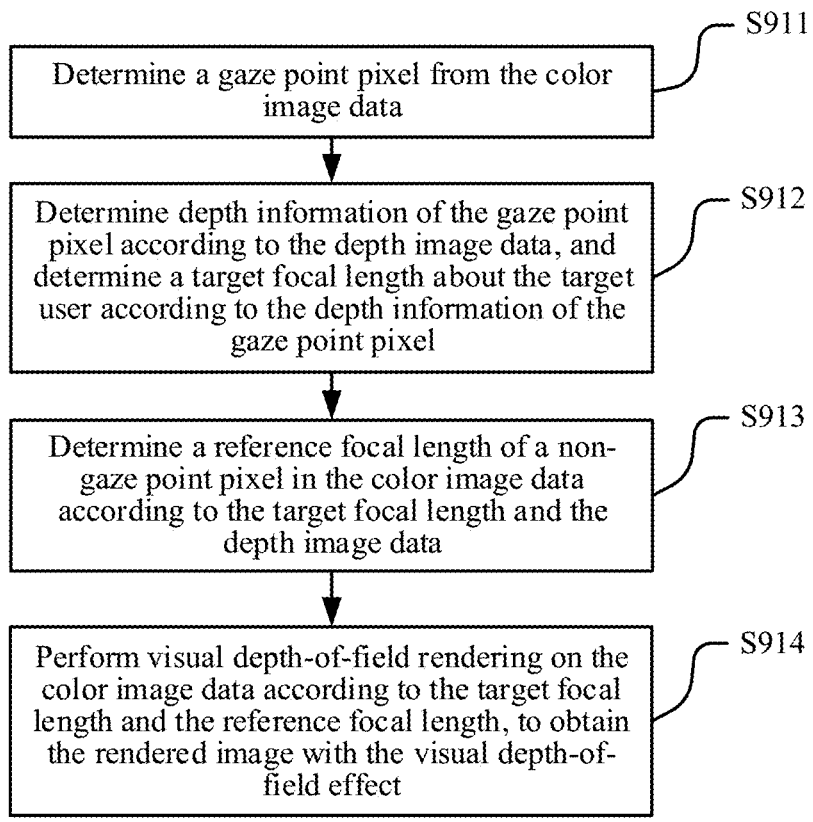
FIG. 9B is a flowchart of operation S902 in FIG. 9A according to an embodiment of the disclosure.

FIG. 9B is a flowchart of operation S902 according to an embodiment of the disclosure. As shown in FIG. 9B, operation S902 may include the following operations S911-S914:

S911: Determine a gaze point pixel from the color image data.

S912: Determine depth information of the gaze point pixel according to the depth image data, and determine a target focal length about the target user according to the depth information of the gaze point pixel.

S913: Determine a reference focal length of a non-gaze point pixel in the color image data according to the target focal length and the depth image data.

S914: Perform visual depth-of-field rendering on the color image data according to the target focal length and the reference focal length, to obtain the rendered image with the visual depth-of-field effect.

In some embodiments, a pixel value of the depth image data reflects a distance, that is, depth information, between a surface point of a scene object corresponding to each pixel on the image of the current scene and the eyes of the target user. Therefore, the depth information of the gaze point pixel may be used as the target focal length of the target user. Similarly, the reference focal length of a non-gaze point pixel in the color image data may be corresponding to a pixel value of each non-gaze point pixel in the depth image data.

Figure 11:
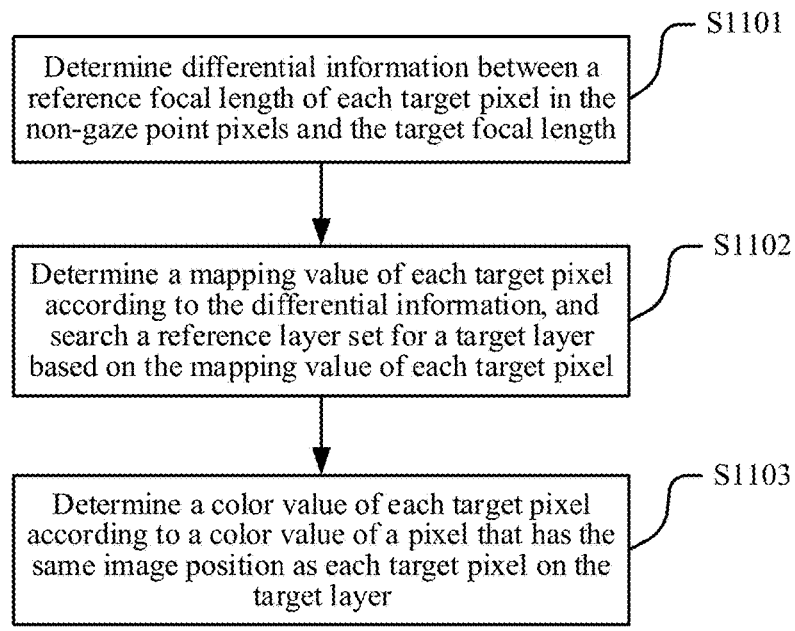
FIG. 11 is a flowchart of performing visual depth-of-field rendering on a color image according to a target focal length and a reference focal length according to an embodiment of the disclosure.

FIG. 11 is a schematic flowchart of operation S914 in which the image processing device performs the visual rendering on the color image according to the target focal length and the reference focal length according to an embodiment of the disclosure. As shown in FIG. 11, operation S914 includes the following operations:

S1101: Determine differential information between a reference focal length of a target pixel in non-gaze point pixels and a target focal length, a target pixel in the non-gaze area being a currently calculated pixel in the non-gaze area.

S1102: Determine a mapping value of the target pixel according to the differential information, and search the reference layer set for the target layer based on the mapping value of the target pixel.

S1103: Determine a color value of the target pixel according to a color value of a pixel that has the same image position as the target pixel on the target layer.

In an embodiment, the mapping value may be a CoC value, and may be any number between 0 and 1. The mapping value may reflect a distance between the target pixel in the non-gaze point pixels and a gaze point pixel. A larger mapping value indicates a larger distance between the target pixel and the gaze point pixel and a fuzzier image of the target pixel. Therefore, a larger mapping value indicates lower definition of the target pixel.

In an embodiment, the searching, by the image processing device, the reference layer set for the target layer based on the mapping value of the target pixel in operation S1102 may include the following operation: presetting a correspondence between at least one group of reference layers and mapping values, and determining the target layer corresponding to the mapping value of the target pixel from the preset correspondence according to the mapping value of the target pixel. Assuming that the resolution of the color image data in the first area is 600×600, and a plurality of reference layers with resolutions such as 300×300, 150×150, and 75×75 are generated according to the preset rule. In this case, a mapping value corresponding to a reference layer with a resolution of 300×300 may be 0.2, a mapping value corresponding to a reference layer with a resolution of 150×150 may be 0.5, and a mapping value corresponding to a reference layer with a resolution of 75×75 may be 0.8. Based on the assumed correspondence between the reference layers and the mapping values, if the mapping value of the target pixel is 0.5, the reference layer with the resolution of 150×150 is selected as the target layer. The correspondence between the reference layers and the mapping values needs to be set according to the correspondence rule that a larger mapping value indicates a lower resolution of a reference layer.

In an embodiment, in operation S1102, the target pixel may be any pixel in the non-gaze point pixels, and the differential information may include a focal length difference between the reference focal length of the target pixel and the target focal length. For example, the target focal length is f, the reference focal length of the target pixel is $f_0$, and a focal length difference between the reference focal length of the target pixel and the target focal length is $f_0-f$. In an embodiment, a manner of determining the mapping value of the target pixel according to the differential information in operation S1102 may be: determining the mapping value of the target pixel according to the focal length difference in the differential information. A specific manner may be: determining a correspondence between at least one group of focal length differences and mapping values in advance, and after the focal length difference between the reference focal length of the target pixel and the target focal length is obtained, searching the correspondence for the mapping value corresponding to the focal length difference as the mapping value of the target pixel.

In other embodiments, the differential information in operation S1102 may further include a mapping value difference. The mapping value difference may be a difference between a mapping value corresponding to the reference focal length of the target pixel and a mapping value corresponding to the target focal length. In some embodiments, a correspondence between a group of focal lengths (including the target focal length and the reference focal length) and mapping values is preset. After a target focal length of a gaze point pixel is determined, the mapping value corresponding to the target focal length is found according to the preset correspondence. After the reference focal length of the target pixel is determined, the mapping value corresponding to the reference focal length is found according to the preset correspondence. Further, the mapping value difference is determined according to the mapping value corresponding to the target focal length and the mapping value corresponding to the reference focal length of the target pixel. In an embodiment, a manner of determining the mapping value of the target pixel according to the differential information in operation S802 may be determining the mapping value of the target pixel according to the mapping value difference in the differential information. A specific manner may be using the mapping value difference in the differential information as the mapping value of the target pixel.

In an embodiment, a process of generating the reference layer set in operation S1102 may be: generating the plurality of reference layers with different resolutions but the same size for the color image data of the first area according to the preset rule, and combining the plurality of reference layers into the reference layer set. The resolutions of the reference layers in the reference layer set are different and not greater than the resolution of the color image data. The sizes of the reference layers are the same and equal to the size of the color image data.

In an embodiment, if there is one target layer in operation S1102, operation S1103 performed by the image processing device may specifically include the following operation: using the color value of the pixel that has the same image position as the target pixel on the target layer as the color value of the target pixel. In an embodiment, if there are at least two target layers in operation S1102, operation S1103 performed by the image processing device may specifically include the following operations: obtaining color values of pixels that have the same image position as the target pixel on at least two target layers, to obtain at least two color values; and calculating the at least two color values according to a preset computation rule, and using a value obtained through the calculation as the color value of the target pixel. In some embodiments, the preset computation rule may be average value calculation, weighted average computation or another computation, which is not specifically limited in this embodiment of the disclosure.

In other words, before operation S1103 is performed, the quantity of the target layers found in the reference layer set based on the mapping value of the target pixels in operation S1102 may be determined first, and the color value of the target pixel is then determined based on the quantity of the target layers and according to color values of pixels that have the same image position as the target pixel on the target layers.

Figure 12A:
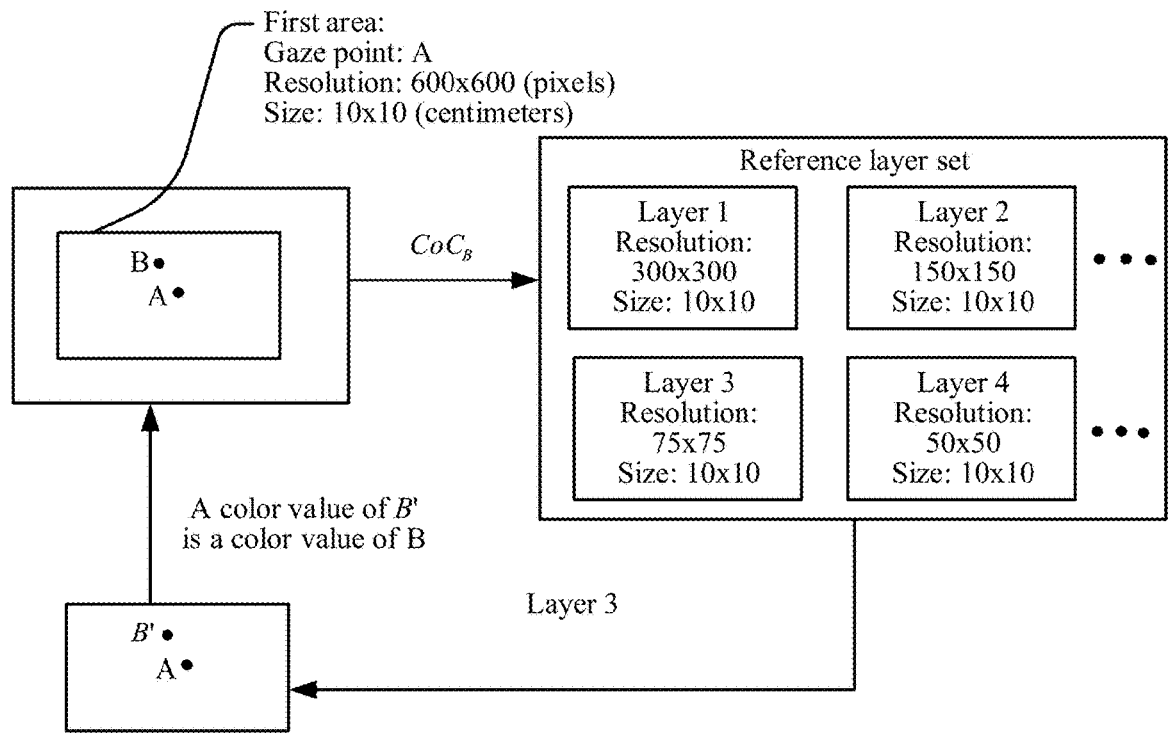
FIG. 12A is a flowchart of a method for determining a color value of a target pixel according to a target layer according to an embodiment of the disclosure.

In an embodiment, if there is one target layer, a color value of a pixel that has the same image position as the target pixel on the target layer is determined as the color value of the target pixel. FIG. 12A is a flowchart of a method for determining a color value of a target pixel when there is one target layer. In FIG. 12A, it may be assumed that an area A represents the first area, F represents a gaze point pixel in the first area, and B represents the target pixel in the non-gaze point pixels in the first area. In addition, it is assumed that the obtained color image data of the first area is an image with a resolution of 600×600, and the mapping value of the target pixel B that is determined according to the differential information between the reference focal length of the target pixel and the target focal length is represented as $CoC_B$ ($CoC_B$ is any number between 0 and 1). Further, it is assumed that four reference layers with different resolutions are generated for the image with the resolution of 600×600 according to a preset rule. The resolutions of the four reference layers may be 300×300, 150×150, 75×75, and 50×50, respectively. It is found base on a preset correspondence between reference layers and mapping values that a target layer corresponding to $CoC_B$ is the layer with the resolution of 75×75 in the reference layer set. A pixel, that is, B', that has the same image position as the target pixel B on the target layer corresponding to $CoC_B$ (that is, the layer with the resolution of 75×75 in the reference layer set) is obtained. Next, a color value of the obtained B' is used as a color value of the target pixel B.

Figure 12B:
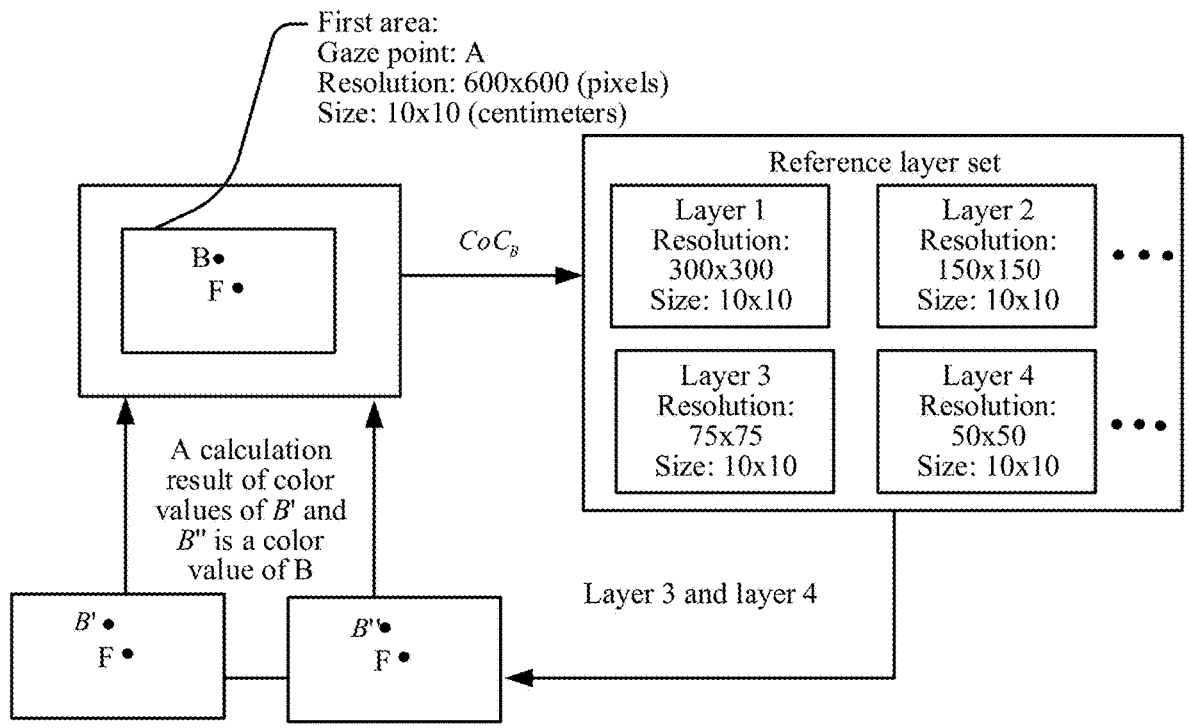
FIG. 12B is a flowchart of another method for determining a color value of a target pixel according to a target layer according to an embodiment of the disclosure.

As another embodiment, if there are two or more target layers, color values of pixels that have the same image position as the target pixel on at least two target layers may be obtained, the at least two color values are calculated according to a preset computation rule, and a value obtained through the calculation is used as the color value of the target pixel. Based on the assumption of FIG. 12A, if it is found according to the preset correspondence between reference layers and mapping values that target layers corresponding to $CoC_B$ are the reference layer with the resolution of 75×75 and the reference layer with the resolution of 50×50 in the reference layer set, as shown in FIG. 12B, the pixel B' that has the same image position as the target pixel on the layer with the resolution of 75×75 and a pixel B'' that has the same image position as the target pixel on the layer with the resolution of 50×50 are respectively found. The color value of B' and a color value of B'' are obtained, weighted average computation is performed on the two color values, and a value obtained through the computation is used as the color value of the target pixel B.

In conclusion, in the rendering method shown in FIG. 9A, the color image data is rendered based on the depth image data and the first rendering rule, to obtain the rendered image with the visual depth-of-field effect. First, the position of a gaze point of the eyes of the target user needs to be determined. The position of the gaze point is a focal part of the eyes and also the clearest part of the rendered image. Depth information of the gaze point may be obtained by querying the depth image data of the first area that is generated in advance, to calculate a target focal length. To obtain color values of non-gaze point pixels in the first area, a mapping value of each non-gaze point pixel may be calculated by using a difference between depth information of the non-gaze point pixel and a target focal length. Next, a reference layer corresponding to the non-gaze point pixel may be queried by using the mapping values of the non-gaze point pixels as a reference basis, and the color values of the non-gaze point pixels may further be determined. For example, if a mapping value of a target pixel in the non-gaze point pixels is large, a reference layer that is generated in advance and has a lower resolution is queried, and a color value of a pixel that has the same image position as the target pixel on the reference layer is used as the color value of the target pixel. Through the foregoing process, the rendered image with the visual depth-of-field effect may be obtained.

Figure 13A:
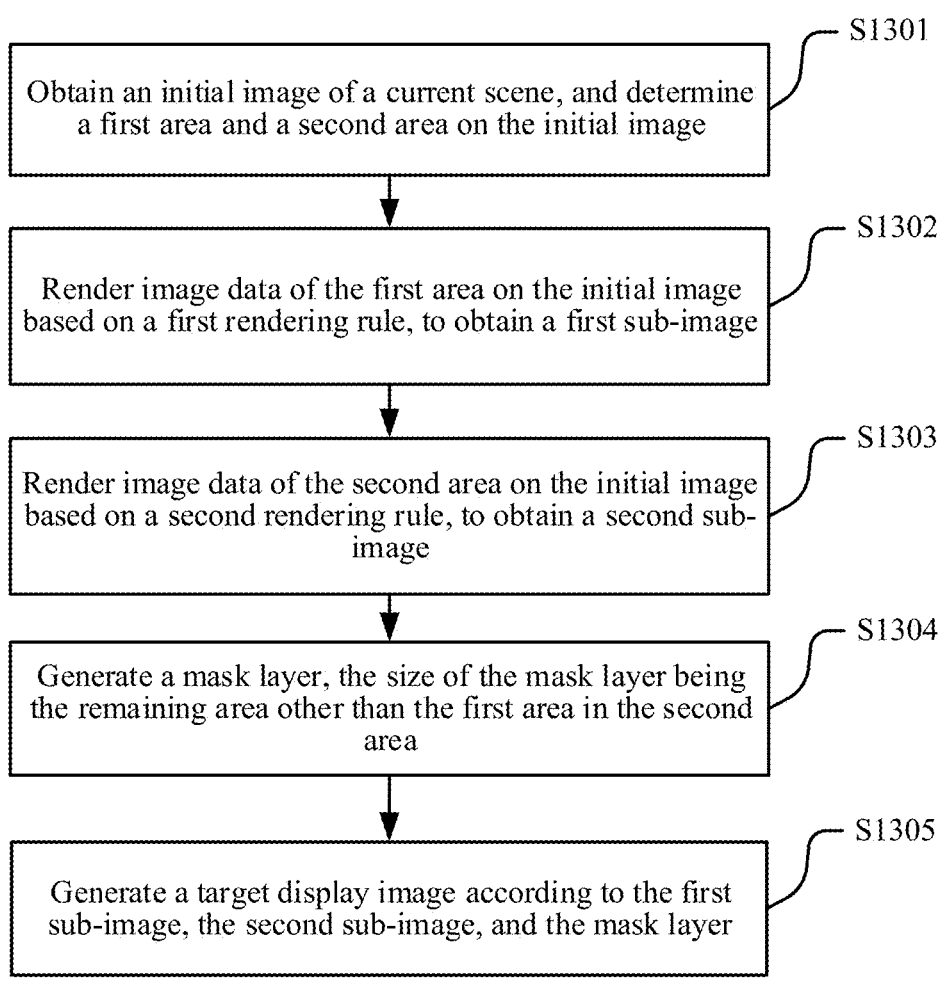
FIG. 13A is a flowchart of another image rendering method according to an embodiment of the disclosure.

An embodiment of the disclosure further provides an image rendering method, performed by an image processing device. FIG. 13A is a flowchart of another image rendering method according to an embodiment of the disclosure. As shown in FIG. 13A, the method includes the following operations:

S1301: Obtain an initial image of a current scene, and determine a first area and a second area on the initial image.

S1302: Render image data of the first area on the initial image based on a first rendering rule, to obtain a first sub-image.

S1303: Render image data of the second area on the initial image based on a second rendering rule, to obtain a second sub-image.

S1304: Generate a mask layer, the size of the mask layer being the remaining area other than the first area in the second area.

In an embodiment, the size of the mask layer may be determined according to the size of the remaining area. To achieve natural fusion of the first sub-image and the second sub-image, the size of the mask layer may be greater than or equal to the size of the remaining area.

In an embodiment, the shape of the mask layer may be the shape of the remaining area other than the first area in the second area. For example, the shape may be a ring, homocentric squares or the like.

S1305: Generate a target display image according to the first sub-image, the second sub-image, and the mask layer, the first rendering rule being different from the second rendering rule.

In some embodiments, layer superimposition is performed on the first sub-image, the second sub-image, and the mask layer according to the position of the first sub-image on the initial image, to generate the target display image. The target display image includes a gaze area and a non-gaze area. A color value of a pixel in the gaze area is calculated based on color values of pixels on the first sub-image. The non-gaze area is an overlapping area obtained by performing layer superimposition on the second area and the mask layer. A color value of a pixel in the non-gaze area is calculated according to color values of pixels on the second sub-image and color values of pixels on the mask layer.

In some embodiments, the gaze area corresponding to the first sub-image is determined; a color value of each pixel in the gaze area of the target display image is calculated; the mask layer is superimposed on the second sub-image, and the remaining area other than the gaze area on the second sub-image obtained after the superimposition is determined as the non-gaze area of the target display image; a color value of each pixel in the non-gaze area is calculated; and the gaze area and the non-gaze area are rendered according to the color value of each pixel in the gaze area and the color value of each pixel in the non-gaze area, to obtain the target display image.

In some embodiments, after the size and the shape of the mask layer are determined, the mask layer is generated. Next, a mask value of each pixel on the mask layer is calculated. In an embodiment, the method for calculating a mask value of a target pixel on a mask layer may be: when a circular ring is determined according to the mask layer, obtaining a radius value of an outer ring of the circular ring, the radius value being denoted by R, and obtaining a radius value of an inner ring of the circular ring, the radius value being denoted by r; determining a distance between the target pixel and the center of the circular ring, the distance being denoted by 1, $R-r \leq 1 \leq R$; and calculating the mask value of the target pixel by using the following formula: $M=1-(1/R)$, M representing the mask value of the target pixel on the mask layer. It may be understood that a mask value of a non-target pixel on the mask layer may be calculated by using the same method for calculating a mask value of a target pixel, the target pixel on the mask layer being a currently calculated pixel on the mask layer.

Figure 13B:
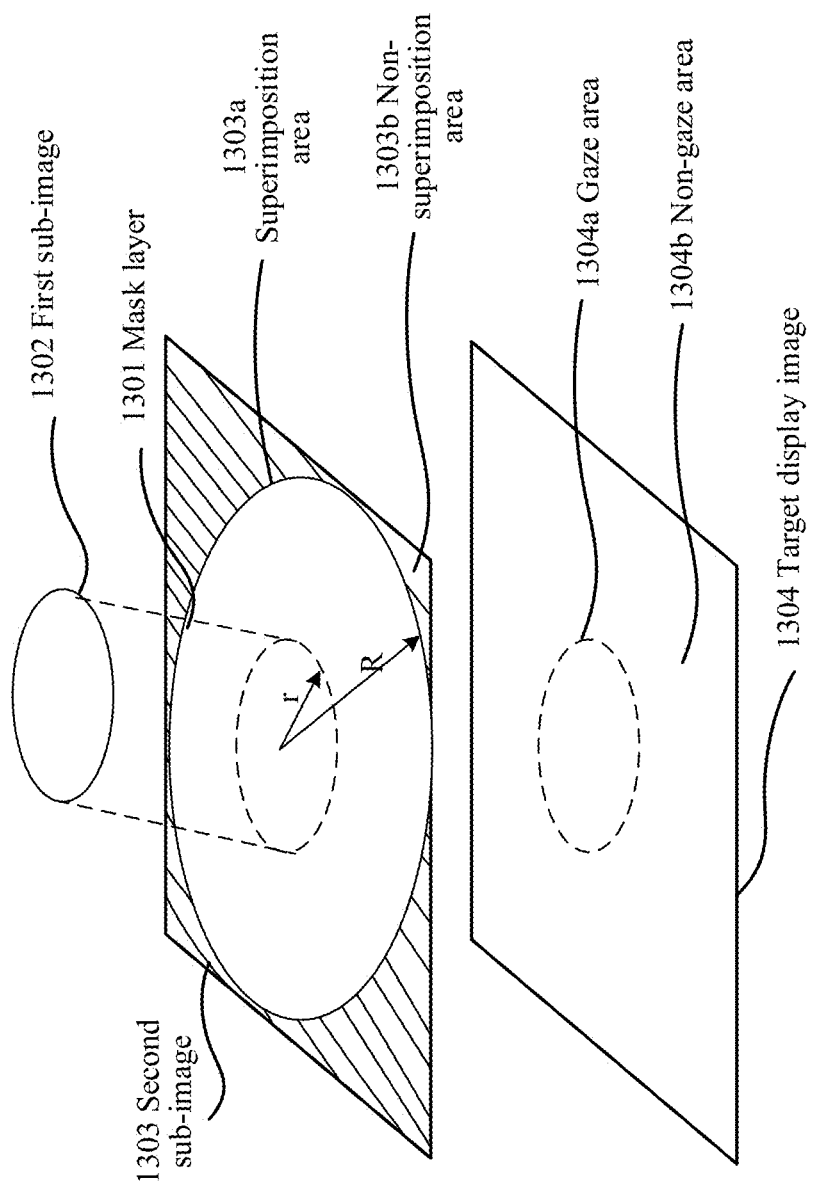
FIG. 13B is a schematic diagram of another method for generating a target display image according to an embodiment of the disclosure.

FIG. 13B is a schematic diagram of another method for generating a target display image according to an embodiment of the disclosure. As shown in FIG. 13B, an annular mask layer 1301 is generated. The size of an inner ring area is consistent with the size of a first sub-image 1302. A radius value of an outer ring of the circular ring is denoted by R, and a radius value of the inner ring of the circular ring is denoted by r. A second sub-image 1303 is superimposed with the mask layer 1301, to form a superimposition area 1303a and a non-superimposition area 1303b. An area corresponding to the first sub-image 1302 is a gaze area 1304a, and the remaining area other than the gaze area 1304a on the second sub-image 1303 obtained after the superimposition is determined as a non-gaze area 1304b of a target display image. The gaze area 1304a and the non-gaze area 1304b are rendered according to a color value of each pixel in the gaze area and a color value of each pixel in the non-gaze area, to obtain the target display image 1304.

In an embodiment, the color value of each pixel in the non-gaze area 1304b of the target display image may be calculated by using the following formula: $B=O \times M$. B represents a color value of a target pixel in the non-gaze area, O represents a color value of a pixel that has the same image position as the target pixel on the second sub-image, and M represents a mask value of a pixel that has the same image position as the target pixel on the mask layer. The target pixel in the non-gaze area is a currently calculated pixel in the gaze area. It can be seen that when $1=R$, the mask value $M=0$, which indicates that the target pixel is the fuzziest. When $1>R$, mask values corresponding to target pixels outside the mask layer in the non-gaze area are consistent with mask values of pixels present when $1=R$.

Figure 14:
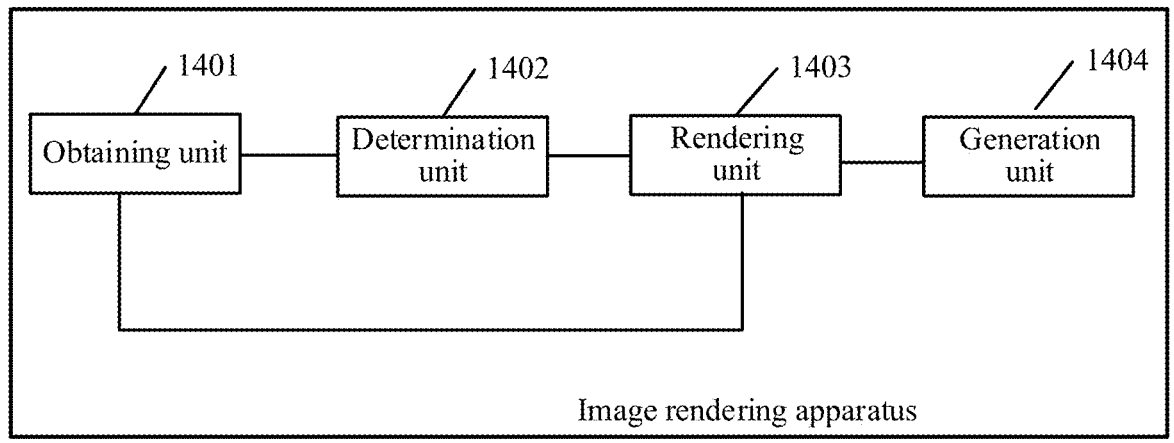
FIG. 14 is a schematic structural diagram of an image rendering apparatus according to an embodiment of the disclosure.

By using the technical solution according to the disclosure, the second area and the mask layer are superimposed, so that the non-gaze area gradually becomes fuzzy from inside to outside, and the first sub-image of the gaze area remains clear, thereby implementing a rendered image with a visual depth-of-field effect. Based on the descriptions of the foregoing method embodiment, an embodiment of the disclosure further provides an image rendering apparatus. FIG. 14 is a schematic structural block diagram of the image rendering apparatus. As shown in FIG. 14, the image rendering apparatus in this embodiment of the disclosure includes an obtaining unit 1401, a determination unit 1402, a rendering unit 1403, and a generation unit 1404. In this embodiment of the disclosure, the image rendering apparatus may further be disposed in a device that needs to render image data.

In an embodiment, the obtaining unit 1401 is configured to obtain an initial image of a current scene. The determination unit 1402 is configured to determine a first area and a second area on the initial image. The rendering unit 1403 is configured to render image data of the first area on the initial image based on a first rendering rule, to obtain a first sub-image. The rendering unit 1403 is further configured to render image data of the second area on the initial image based on a second rendering rule, to obtain a second sub-image. The generation unit 1404 is configured to generate a target display image according to the first sub-image and the second sub-image.

In an embodiment, an implementation of the determination unit 1402 being configured to obtain an initial image of a current scene may be: performing human eye tracking on a target user by using a human eye tracking strategy, to determine a gaze point on the initial image; and determining the first area on the initial image according to the gaze point and a target FOV.

In an embodiment, the first rendering rule is different from the second rendering rule. An implementation of the rendering unit 1303 being configured to render image data of the first area on the initial image based on a first rendering rule, to obtain a first sub-image may be: obtaining color image data of the first area from the initial image, and obtaining depth image data of the first area; rendering the color image data based on the depth image data and the first rendering rule, to obtain a rendered image with a visual depth-of-field effect; and using the obtained rendered image as the first sub-image.

In an embodiment, an implementation of the rendering the color image data based on the depth image data and the first rendering rule, to obtain a rendered image with a visual depth-of-field effect may be: determining a gaze point pixel from the color image data; determining depth information of the gaze point pixel according to the depth image data, and determining a target focal length about the target user according to the depth information of the gaze point pixel; determining a reference focal length of a non-gaze point pixel in the color image data according to the target focal length and the depth image data; and performing visual depth-of-field rendering on the color image data according to the target focal length and the reference focal length, to obtain the rendered image with the visual depth-of-field effect.

In an embodiment, a reference layer set includes a plurality of reference layers, the reference layers have the same image size, and the resolutions of the reference layers are different and less than an image resolution corresponding to the color image data. In an embodiment, an implementation of the performing visual depth-of-field rendering on the color image data according to the target focal length and the reference focal length, to obtain the rendered image with the visual depth-of-field effect may be: determining differential information between a reference focal length of a target pixel in the non-gaze point pixels and a target focal length; determining a mapping value of the target pixel according to the differential information, and searching the reference layer set for a target layer based on the mapping value of the target pixel; and determining a color value of the target pixel according to a color value of a pixel that has the same image position as the target pixel on the target layer.

In an embodiment, there is one target layer. In this case, an implementation of the determining a color value of the target pixel according to a color value of a pixel that has the same image position as the target pixel on the target layer may be: using the color value of the pixel that has the same image position as the target pixel on the target layer as the color value of the target pixel. In another embodiment, there are at least two target layers. In this case, an implementation of the determining a color value of the target pixel according to a color value of a pixel that has the same image position as the target pixel on the target layer may be: obtaining color values of pixels that have the same image position as the target pixel on at least two target layers, to obtain at least two color values; and calculating the at least two color values according to a preset computation rule, and using a value obtained through the calculation as the color value of the target pixel.

In an embodiment, an implementation of the rendering unit 1403 being configured to render image data of the second area on the initial image based on a second rendering rule, to obtain a second sub-image may be: rendering the image data of the second area based on a resolution and an image quality parameter indicated by the second rendering rule, to obtain the second sub-image.

In an embodiment, an implementation of the generation unit 1404 being configured to generate a target display image according to the first sub-image and the second sub-image may be: generating a mask layer; and performing layer superimposition on the first sub-image, the second sub-image, and the mask layer according to the position of the first sub-image on the initial image, to generate the target display image. The target display image includes a gaze area and a non-gaze area. The gaze area is an overlapping area formed by performing layer superimposition on the first sub-image, the second sub-image, and the mask layer. A color value of a pixel in the gaze area is calculated based on color values of pixels in some areas respectively corresponding to the overlapping area on the first sub-image, the second sub-image, and the mask layer. A color value of a pixel in the non-gaze area is determined according to color values of pixels on the second sub-image.

In an embodiment, during the layer superimposition, the color value of the pixel in the gaze area is calculated by using the following formula: $B=I \times M + O \times (1-M)$. B represents a color value of a target pixel in the gaze area, I represents a color value of a pixel that has the same image position as the target pixel on the first sub-image, O represents a color value of a pixel that has the same image position as the target pixel on the second sub-image, and M represents a mask value of a pixel that has the same image position as the target pixel on the mask layer.

In the embodiments of the disclosure, after the obtaining unit 1401 obtains an initial image of a current scene, the determination unit 1402 determines a first area and a second area on the initial image. Further, the rendering unit 1403 renders the image data of the first area and the image data of the second area based on a first rendering rule and a second rendering rule respectively, to obtain a first sub-image and a second sub-image. Next, the generation unit 1404 generates a target display image according to the first sub-image and the second sub-image, thereby implementing targeted image rendering by area.

Based on the foregoing descriptions in another method embodiment, the functions of the obtaining unit 1401, the determination unit 1402, the rendering unit 1403, and the generation unit 1404 of the image rendering apparatus shown in FIG. 14 may further include:

an obtaining unit 1401, configured to obtain an initial image of a current scene;

a determination unit 1402, configured to determine a first area and a second area on the initial image;

a rendering unit 1403, configured to render image data of the first area on the initial image based on a first rendering rule, to obtain a first sub-image, the rendering unit 1403 being configured to render image data of the second area on the initial image based on a second rendering rule, to obtain a second sub-image; and a generation unit 1404, configured to generate a mask layer, the size of the mask layer being the remaining area other than the first area in the second area, the generation unit 1404 being configured to generate a target display image according to the first sub-image, the second sub-image, and the mask layer, the first rendering rule being different from the second rendering rule.

In some embodiments, the generation unit 1404 performs layer superimposition on the first sub-image, the second sub-image, and the mask layer according to the position of the first sub-image on the initial image, to generate the target display image. The target display image includes a gaze area and a non-gaze area. A color value of a pixel in the gaze area is calculated based on color values of pixels on the first sub-image. The non-gaze area is an overlapping area obtained by performing layer superimposition on the second area and the mask layer. A color value of a pixel in the non-gaze area is calculated according to color values of pixels on the second sub-image and the mask layer.

In some embodiments, the generation unit 1404 determines the gaze area corresponding to the first sub-image; calculates a color value of each pixel in the gaze area of the target display image; superimposes the mask layer on the second sub-image, and determines the remaining area other than the gaze area on the second sub-image obtained after the superimposition as the non-gaze area of the target display image; calculates a color value of each pixel in the non-gaze area; and renders the gaze area and the non-gaze area according to the color value of each pixel in the gaze area and the color value of each pixel in the non-gaze area, to obtain the target display image.

Figure 15:
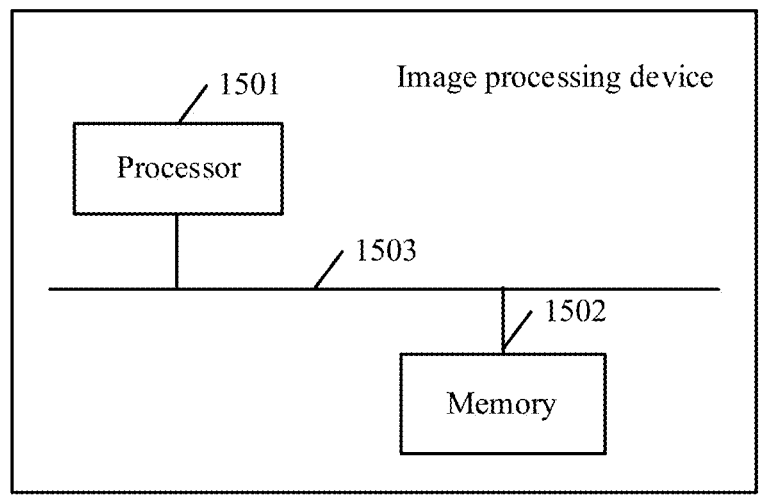
FIG. 15 is a schematic structural diagram of an image processing device according to an embodiment of the disclosure.

FIG. 15 is a schematic structural block diagram of an image processing device according to an embodiment of the disclosure. The image processing device shown in FIG. 15 may include one or more processors 1501 and one or more memories 1502. The processor 1501 and the memory 1502 are connected by a bus 1503. The memory 1502 is configured to store a computer program, the computer program including a program instruction. The processor 1501 is configured to execute the program instruction stored in the memory 1502.

The memory 1502 may include a volatile memory, for example, a random access memory (RAM). The memory 1502 may alternatively include a non-volatile memory, for example, a flash memory or a solid-state drive (SSD). The memory 1502 may alternatively include a combination of the foregoing types of memories.

The processor 1501 may be a CPU. The processor 1501 may further include a hardware chip. The foregoing hardware chip may be an application-specific integrated circuit (ASIC), a programmable logic device (PLD) or the like. The PLD may be a field-programmable gate array (FPGA), a generic array logic (GAL) or the like. The processor 1501 may be alternatively a combination of the foregoing structures.

In an embodiment of the disclosure, the memory 1502 is configured to store a computer program, the computer program including a program instruction. The processor 1501 is configured to execute the program instruction stored in the memory 1502, thereby implementing the operations of the corresponding method in the foregoing embodiments.

In an embodiment, the processor 1501 is configured to invoke the program instruction to: obtain an initial image of a current scene; determine a first area and a second area on the initial image; render image data of the first area on the initial image based on a first rendering rule, to obtain a first sub-image; render image data of the second area on the initial image based on a second rendering rule, to obtain a second sub-image; and generate a target display image according to the first sub-image and the second sub-image.

In an embodiment, an implementation of the processor 1501 being configured to determine a first area on the initial image may be: performing human eye tracking on a target user by using a human eye tracking strategy, to determine a gaze point on the initial image; and determining the first area on the initial image according to the gaze point and a target FOV.

In an embodiment, the first rendering rule is different from the second rendering rule. An implementation of the processor 1501 being configured to render image data of the first area on the initial image based on a first rendering rule, to obtain a first sub-image may be: obtaining color image data of the first area from the initial image, and obtaining depth image data of the first area; rendering the color image data based on the depth image data and the first rendering rule, to obtain a rendered image with a visual depth-of-field effect; and using the obtained rendered image as the first sub-image.

In an embodiment, an implementation of the processor 1501 being configured to render the color image data based on the depth image data and the first rendering rule, to obtain a rendered image with a visual depth-of-field effect may be: determining a gaze point pixel from the color image data; determining depth information of the gaze point pixel according to the depth image data, and determining a target focal length about the target user according to the depth information of the gaze point pixel; determining a reference focal length of a non-gaze point pixel in the color image data according to the target focal length and the depth image data; and performing visual depth-of-field rendering on the color image data according to the target focal length and the reference focal length, to obtain the rendered image with the visual depth-of-field effect.

In an embodiment, a reference layer set includes a plurality of reference layers, the reference layers have the same image size, and the resolutions of the reference layers are different and less than an image resolution corresponding to the color image data. In an embodiment, an implementation of the processor 1501 being configured to perform visual depth-of-field rendering on the color image data according to the target focal length and the reference focal length, to obtain the rendered image with the visual depth-of-field effect may be: determining differential information between a reference focal length of a target pixel in the non-gaze point pixels and a target focal length; determining a mapping value of the target pixel according to the differential information, and searching the reference layer set for a target layer based on the mapping value of the target pixel; and determining a color value of the target pixel according to a color value of a pixel that has the same image position as the target pixel on the target layer.

In an embodiment, there is one target layer. In this case, an implementation of the processor 1501 being configured to determine a color value of the target pixel according to a color value of a pixel that has the same image position as the target pixel on the target layer may be: using the color value of the pixel that has the same image position as the target pixel on the target layer as the color value of the target pixel. In another embodiment, there are at least two target layers. In this case, an implementation of the processor 1501 being configured to determine a color value of the target pixel according to a color value of a pixel that has the same image position as the target pixel on the target layer may be: obtaining color values of pixels that have the same image position as the target pixel on at least two target layers, to obtain at least two color values; and calculating the at least two color values according to a preset computation rule, and using a value obtained through the calculation as the color value of the target pixel.

In an embodiment, an implementation of the processor 1501 being configured to render image data of the second area on the initial image based on a second rendering rule, to obtain a second sub-image may be: rendering the image data of the second area based on a resolution and an image quality parameter indicated by the second rendering rule, to obtain the second sub-image.

In an embodiment, an implementation of the processor 1501 being configured to generate a target display image according to the first sub-image and the second sub-image may be: generating a mask layer; and performing layer superimposition on the first sub-image, the second sub-image, and the mask layer according to the position of the first sub-image on the initial image, to generate the target display image. The target display image includes a gaze area and a non-gaze area. The gaze area is an overlapping area formed by performing layer superimposition on the first sub-image, the second sub-image, and the mask layer. A color value of a pixel in the gaze area is calculated based on color values of pixels in some areas respectively corresponding to the overlapping area on the first sub-image, the second sub-image, and the mask layer. A color value of a pixel in the non-gaze area is determined according to color values of pixels on the second sub-image.

In an embodiment, during the layer superimposition, the color value of the pixel in the gaze area is calculated by using the following formula: $B=I\times M+O\times(1-M)$. B represents a color value of a target pixel in the gaze area, I represents a color value of a pixel that has the same image position as the target pixel on the first sub-image, O represents a color value of a pixel that has the same image position as the target pixel on the second sub-image, and M represents a mask value of a pixel that has the same image position as the target pixel on the mask layer.

A person skilled in the art would understand that all or some procedures in the method in the foregoing embodiments may be implemented by a program instructing related hardware. The program may be stored in a computer-readable storage medium. When being executed, the program may include the procedures according to the embodiments of the foregoing method. The storage medium may be a magnetic disk, an optical disc, a read-only memory (ROM), a RAM or the like. Any reference to a memory, a storage, a database, or another medium used in the embodiments provided in the disclosure may include a non-volatile and/or volatile memory. The non-volatile memory may include ROM, a programmable ROM (PROM), an electrically programmable ROM (EPROM), an electrically erasable programmable ROM (EEPROM), a flash memory, or the like. The volatile memory may include a RAM or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

While the disclosure has been particularly shown and described with reference to example embodiments thereof, it will be understood that various changes in form and details may be made therein without departing from the spirit and scope of the following claims.

What is claimed is:

1. An image rendering method, performed by an image processing device, the method comprising:
    obtaining an initial image of a current scene, and determining a first area and a second area on the initial image;
    rendering first image data of the first area based on a first rendering rule, to obtain a first sub-image;
    rendering second image data of the second area based on a second rendering rule, to obtain a second sub-image; and
    generating a target display image based on the first sub-image and the second sub-image,
    the first rendering rule being different from the second rendering rule,
    wherein the rendering the first image data of the first area comprises:
    obtaining color image data of the first area from the initial image, and obtaining depth image data of the first area, the depth image data indicating information about a distance between a scene object in the initial image and an eye of a user; and
    performing visual depth-of-field rendering on the color image data such that a color value of a target pixel in non-gaze point pixels is adjusted based on a difference between a reference focal length of the target pixel in the non-gaze point pixels and a target focal length of a gaze point pixel.

2. The method according to claim 1, wherein the determining the first area and the second area comprises:
    performing tracking of the eye of the user, to determine a gaze point on the initial image;
    determining the first area based on the gaze point and a target field of view (FOV); and
    determining the second area based on the initial image and the first area.

3. The method according to claim 1, wherein the performing the visual depth-of-field rendering comprises:
    determining the gaze point pixel from the color image data;
    determining depth information corresponding to the gaze point pixel based on the depth image data, and determining the target focal length of the user based on the determined depth information; and
    determining the reference focal length of the target pixel in the non-gaze point pixels in the color image data based on the target focal length and the depth image data.

4. The method according to claim 3, wherein the performing the visual depth-of-field rendering further comprises:
    determining differential information between a reference focal length of each target pixel in the non-gaze point pixels and the target focal length;
    determining a mapping value of each target pixel according to the differential information, and selecting, from a reference layer set, a target layer based on the mapping value of each target pixel; and
    determining a color value of each target pixel according to a color value of a pixel that has a same image position as each target pixel on the target layer.

5. The method according to claim 4, wherein the reference layer set comprises a plurality of reference layers, the plurality of reference layers have a same image size, and resolutions of the plurality of reference layers are different and less than an image resolution corresponding to the color image data.

6. The method according to claim 4, wherein the target layer is a single target layer, and the determining the color value of each target pixel comprises: determining, as the color value of each target pixel, the color value of the pixel that has the same image position as each target pixel on the single target layer.

7. The method according to claim 4, wherein the target layer comprises at least two target layers, and the determining the color value of each target pixel comprises:

obtaining color values of pixels that have a same image position as each target pixel on the at least two target layers; to obtain at least two color values; and calculating the at least two color values according to a preset computation rule, and determining the color value of each target pixel based on a result of the calculating.

8. The method according to claim 1, wherein the rendering the second image data of the second area comprises:
rendering the second image data of the second area based on a resolution and an image quality parameter indicated by the second rendering rule, to obtain the second sub-image.

9. The method according to claim 1, wherein the generating the target display image comprises:
generating a mask layer; and
performing layer superimposition on the first sub-image, the second sub-image, and the mask layer according to a position of the first sub-image on the initial image, to generate the target display image, the target display image comprising a gaze area and a non-gaze area,
a color value of a pixel in the gaze area being based on color values of pixels in areas overlapping between the first sub-image, the second sub-image, and the mask layer, and
a color value of a pixel in the non-gaze area being based on color values of pixels on the second sub-image.

10. The method according to claim 9, wherein the performing the layer superimposition comprises:
determining a superimposition area of the first sub-image on the second sub-image;
superimposing the first sub-image and the mask layer on the superimposition area on the second sub-image, to generate an overlapping area; and
rendering the gaze area based on a color value of each pixel in the overlapping area and rendering the non-gaze area based on a color value of each pixel in a remaining area other than the overlapping area on the second sub-image, to obtain the target display image.

11. The method according to claim 9, further comprising, during the layer superimposition:
obtaining a color value of each pixel in the gaze area by using a formula: $B = I \times M + O \times (1-M)$,
B representing a color value of a target pixel in the gaze area, I representing a color value of a pixel that has a same image position as the target pixel in the gaze area on the first sub-image, O representing a color value of a pixel that has the same image position as the target pixel in the gaze area on the second sub-image, M representing a mask value of a pixel that has the same image position as the target pixel in the gaze area on the mask layer.

12. The method according to claim 1, wherein the generating the target display image comprises:
determining a mixed area based on the first sub-image and the second sub-image;
determining a color value of each pixel in the mixed area based on a distance between each pixel in the mixed area and a center of the initial image; and
generating the target display image based on the color value of each pixel in the mixed area, a color value of each pixel in the second area, and a color value of each pixel in the first area.

13. The method according to claim 12, wherein the first sub-image comprises an edge area and a core area, the core area being determined according to a gaze point and a target field of view (FOV), and wherein the determining the mixed area comprises:
determining a reference area on the second sub-image, the reference area covering a corresponding area of the first sub-image on the second sub-image; and
determining a part other than the core area in the reference area as the mixed area.

14. The method according to claim 12, wherein the determining the color value of each pixel in the mixed area comprises:
determining a reference color value of each target pixel in the mixed area based on a radius of a reference area and a distance between each target pixel in the mixed area and the center of the initial image;
obtaining a first color value of a pixel that has a same image position as each target pixel in the mixed area on the first sub-image, and obtaining a second color value of a pixel that has the same image position as each target pixel in the mixed area on the second sub-image; and
obtaining a final color value of each target pixel in the mixed area based on the first color value and the second color value.

15. The method according to claim 12, wherein the generating the target display image comprises:
rendering the mixed area based on the color value of each pixel in the mixed area;
rendering a core area based on a color value of each pixel in the core area on the first sub-image, the core area being determined according to a gaze point and a target field of view (FOV); and
rendering a remaining part other than the core area and the mixed area on the second sub-image according to a color value of each pixel in the remaining part on the second sub-image, to obtain the target display image.

16. A non-transitory computer-readable storage medium, storing a computer program, which, when executed by a processor, causes the processor to perform the method of claim 1.

17. An image rendering method, performed by an image processing device, the method comprising:
obtaining an initial image of a current scene, and determining a first area and a second area on the initial image;
rendering first image data of the first area based on a first rendering rule, to obtain a first sub-image;
rendering second image data of the second area based on a second rendering rule, to obtain a second sub-image;
generating a mask layer, a size of the mask layer corresponding to a remaining area other than the first area in the second area; and
generating a target display image based on the first sub-image, the second sub-image, and the mask layer,
the first rendering rule being different from the second rendering rule,
wherein the rendering the first image data of the first area comprises:
obtaining color image data of the first area from the initial image, and obtaining depth image data of the first area, the depth image data indicating information about a distance between a scene object in the initial image and an eye of a user; and
performing visual depth-of-field rendering on the color image data such that a color value of a target pixel in non-gaze point pixels is adjusted based on a difference between a reference focal length of the target pixel in the non-gaze point pixels and a target focal length of a gaze point pixel.

18. An image processing device, comprising a processor and a memory, the memory being configured to store a computer program, which, when executed by the processor, causes the processor to perform the method of claim 17.

19. An image rendering apparatus, comprising:
- at least one memory configured to store program code; and
- at least one processor configured to read the program code and operate as instructed by the program code, the program code comprising:
  - obtaining code configured to cause the at least one processor to obtain an initial image of a current scene;
  - determination code configured to cause the at least one processor to determine a first area and a second area on the initial image;
  - rendering code configured to cause the at least one processor to render first image data of the first area on the initial image based on a first rendering rule, to obtain a first sub-image, and render second image data of the second area on the initial image based on a second rendering rule, to obtain a second sub-image; and
  - generation code configured to cause the at least one processor to generate a target display image according to the first sub-image and the second sub-image,
  - the first rendering rule being different from the second rendering rule,
- wherein the rendering the first image data of the first area comprises:
- obtaining color image data of the first area from the initial image, and obtaining depth image data of the first area, the depth image data indicating information about a distance between a scene object in the initial image and an eye of a user; and
- performing visual depth-of-field rendering on the color image data such that a color value of a target pixel in non-gaze point pixels is adjusted based on a difference between a reference focal length of the target pixel in the non-gaze point pixels and a target focal length of a gaze point pixel.

* * * * *